(12) United States Patent
Kelley et al.

(10) Patent No.: US 11,802,381 B2
(45) Date of Patent: *Oct. 31, 2023

(54) ASPHALT SHINGLE WASTE ROOFING MATERIALS AND RELATED METHODS

(71) Applicant: BMIC LLC, Dallas, TX (US)

(72) Inventors: Dale Kelley, Flower Mound, TX (US); James Svec, Kearney, NJ (US); Michael T. Ferraro, Savannah, GA (US); Kirby Erickson, Waxahachie, TX (US); Paul Richardson, Euless, TX (US); Kris Edelsward, Lockport, NY (US)

(73) Assignee: BMIC LLC, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/062,511

(22) Filed: Dec. 6, 2022

(65) Prior Publication Data

US 2023/0094218 A1 Mar. 30, 2023

Related U.S. Application Data

(63) Continuation of application No. 18/061,895, filed on Dec. 5, 2022, which is a continuation of application
(Continued)

(51) Int. Cl.
*E01C 19/00* (2006.01)
*E01C 19/05* (2006.01)
(Continued)

(52) U.S. Cl.
CPC .......... *E01C 19/05* (2013.01); *B02C 19/0056* (2013.01); *B02C 23/08* (2013.01);
(Continued)

(58) Field of Classification Search
CPC . E01C 19/05; E01C 19/1004; B02C 19/0056; B02C 23/08; C08L 95/00; C08L 2555/34
See application file for complete search history.

(56) References Cited

U.S. PATENT DOCUMENTS

| 3,026,568 A | 3/1962 | Moar |
| 4,352,837 A | 10/1982 | Kopenhaver |

(Continued)

FOREIGN PATENT DOCUMENTS

| WO | 2018/091769 A1 | 5/2018 |
| WO | 2018/094315 A2 | 5/2018 |

(Continued)

*Primary Examiner* — Anshu Bhatia
(74) *Attorney, Agent, or Firm* — GREENBERG TRAURIG, LLP

(57) ABSTRACT

Non-limiting embodiments of the present disclosure relate to a method comprising: obtaining asphalt shingle waste (ASW) and performing grinding, screening, and separating steps on the ASW. In some embodiments, granules are removed from the ASW. In some embodiments, the method transforms ASW into ASW powder. In some embodiments, the ASW powder is formed into a plurality of briquettes. In some embodiments, at least one of: the ASW powder, the plurality of briquettes, or any combination thereof is fed into a mixing process that results in an ASW powder filled coating.

30 Claims, 3 Drawing Sheets

Related U.S. Application Data

No. 17/733,784, filed on Apr. 29, 2022, now Pat. No. 11,519,137, which is a continuation of application No. 16/951,756, filed on Nov. 18, 2020, now Pat. No. 11,746,478, which is a continuation of application No. 16/883,503, filed on May 26, 2020, now Pat. No. 10,858,790, which is a continuation of application No. 16/789,219, filed on Feb. 12, 2020, now Pat. No. 10,683,620.

(60) Provisional application No. 62/912,411, filed on Oct. 8, 2019, provisional application No. 62/904,476, filed on Sep. 23, 2019.

(51) Int. Cl.
| | | |
|---|---|---|
| *E01C 19/10* | (2006.01) | |
| *B02C 19/00* | (2006.01) | |
| *C08L 5/00* | (2006.01) | |
| *B02C 23/08* | (2006.01) | |

(52) U.S. Cl.
CPC ............ *C08L 5/00* (2013.01); *E01C 19/1004* (2013.01); *C08L 2555/34* (2013.01)

(56) References Cited

U.S. PATENT DOCUMENTS

| | | | |
|---|---|---|---|
| 4,706,893 A | 11/1987 | Brock | |
| 5,209,802 A | 5/1993 | Hannah et al. | |
| 5,385,426 A | 1/1995 | Omann | |
| 5,718,787 A * | 2/1998 | Gallagher | C03C 25/146 |
| | | | 427/205 |
| 5,848,755 A | 12/1998 | Zickell et al. | |
| 6,120,838 A | 9/2000 | Zickell | |
| 6,743,313 B2 | 6/2004 | Mischo | |
| 6,984,670 B2 | 1/2006 | Meyers, III et al. | |
| 7,052,635 B2 | 5/2006 | Mischo | |
| 7,297,301 B1 | 11/2007 | Deschamps et al. | |
| 7,891,590 B2 | 2/2011 | Rasmussen | |
| 7,913,940 B2 | 3/2011 | Harmon | |
| 8,083,166 B2 | 12/2011 | Gould et al. | |
| 8,162,242 B2 | 4/2012 | Hofmann et al. | |
| 8,177,152 B2 | 5/2012 | Harmon | |
| 8,186,610 B2 | 5/2012 | Gould et al. | |
| 8,210,458 B2 | 7/2012 | Strasser et al. | |
| 8,388,873 B2 | 3/2013 | Hofmann et al. | |
| 8,496,196 B2 | 7/2013 | Zickell et al. | |
| 8,672,248 B2 | 3/2014 | Zickell et al. | |
| 8,783,590 B2 | 7/2014 | Zickell et al. | |
| 8,789,773 B2 | 7/2014 | Teeter, Jr. et al. | |
| 8,919,681 B1 | 12/2014 | Horton et al. | |
| 9,156,035 B1 | 10/2015 | Horton et al. | |
| 9,227,196 B2 | 1/2016 | Hassan et al. | |
| 9,273,228 B1 | 3/2016 | Hyer et al. | |
| 9,295,992 B2 | 3/2016 | Zickell | |
| 9,382,423 B2 | 7/2016 | Bolton et al. | |
| 9,440,239 B1 | 9/2016 | Horton et al. | |
| 9,457,354 B2 | 10/2016 | Svec et al. | |
| 9,550,311 B1 | 1/2017 | Neel | |
| 9,834,895 B2 | 12/2017 | Neel | |
| 9,855,677 B2 | 1/2018 | Brock et al. | |
| 9,951,223 B2 | 4/2018 | Gillespie et al. | |
| 9,951,224 B2 | 4/2018 | Russell | |
| 10,196,783 B2 | 2/2019 | Dempsey et al. | |
| 10,323,149 B2 | 6/2019 | Russell | |
| 10,683,620 B1 | 6/2020 | Kelley et al. | |
| 10,858,790 B1 | 12/2020 | Kelley et al. | |
| 11,059,976 B2 | 7/2021 | Franzen et al. | |
| 11,499,276 B2 * | 11/2022 | Kelley | E01C 19/1004 |
| 2002/0066813 A1 | 6/2002 | Mischo | |
| 2008/0184661 A1 | 8/2008 | Lombard | |
| 2008/0314803 A1 | 12/2008 | Burke | |
| 2010/0064937 A1 | 3/2010 | Harmon et al. | |
| 2010/0307380 A1 | 12/2010 | Fader | |
| 2011/0041731 A1 | 2/2011 | Lombard | |
| 2013/0199410 A1 | 8/2013 | Maldonado et al. | |
| 2013/0220175 A1 | 8/2013 | Zickell | |
| 2013/0307172 A1 | 11/2013 | Seder et al. | |
| 2013/0313344 A1 | 11/2013 | Nykulin et al. | |
| 2014/0014000 A1 | 1/2014 | Franzen et al. | |
| 2014/0269143 A1 | 9/2014 | Gencer | |
| 2014/0299018 A1 | 10/2014 | Elseifi et al. | |
| 2014/0331897 A1 | 11/2014 | Elseifi | |
| 2014/0373749 A1 | 12/2014 | Zickell et al. | |
| 2015/0252534 A1 | 9/2015 | Dempsey et al. | |
| 2016/0362338 A1 * | 12/2016 | Reinke | C08K 5/05 |
| 2016/0362339 A1 | 12/2016 | Franzen et al. | |
| 2018/0141866 A1 | 5/2018 | Kotefski et al. | |
| 2018/0186963 A1 | 7/2018 | Kotefski et al. | |
| 2018/0208771 A1 | 7/2018 | Gillespie et al. | |
| 2018/0243798 A1 | 8/2018 | Abraham et al. | |
| 2018/0334620 A1 | 11/2018 | Kotefski et al. | |
| 2019/0039105 A1 | 2/2019 | Burns, Sr. et al. | |
| 2019/0300427 A1 | 10/2019 | Horton | |
| 2019/0375940 A1 | 12/2019 | Franzen et al. | |

FOREIGN PATENT DOCUMENTS

| | | |
|---|---|---|
| WO | 2018/125952 A2 | 7/2018 |
| WO | 2019/134729 A1 | 7/2019 |

* cited by examiner

ASPHALT SHINGLE WASTE ROOFING MATERIALS AND RELATED METHODS

RELATED APPLICATIONS

This application is a continuation of U.S. patent application Ser. No. 18/061,895 filed Dec. 5, 2022, which is a continuation of U.S. patent application Ser. No. 17/733,784 filed Apr. 29, 2022, now U.S. Pat. No. 11,519,137, which is a continuation U.S. patent application Ser. No. 16/951,756 filed Nov. 18, 2020, which is a continuation of U.S. patent application Ser. No. 16/883,503 filed May 26, 2020, now U.S. Pat. No. 10,858,790, which is a continuation of U.S. patent application Ser. No. 16/789,219 filed Feb. 12, 2020, now U.S. Pat. No. 10,683,620, which claims priority to U.S. Provisional Application No. 62/904,476 filed Sep. 23, 2019, and to U.S. Provisional Application No. 62/912,411 filed Oct. 8, 2019, all of which are incorporated herein by reference in their respective entirety for all purposes.

FIELD

In some embodiments, the present disclosure relates to methods of forming asphalt shingle waste powder from asphalt shingle waste.

In some embodiments, the field of the present disclosure relates to the formation of filled coatings from asphalt shingle waste (ASW) or asphalt containing (AC) powders.

BACKGROUND

Approximately 11 million tons of asphalt shingle waste (ASW) are generated in the U.S. each year. ASW can take hundreds of years to decompose in a landfill. Accordingly, ASW presents a major environmental problem. Improved methods of processing ASW are needed.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclose relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles has an average particle size of 2 microns to 250 microns; grinding the fourth set of ASW particles; wherein the grinding of the fourth set of ASW particles results in a sixth set of ASW particles, wherein the sixth set of ASW particles have an average particle size of 2 microns to 250 microns; wherein each of the fifth set of ASW particles and the sixth set of ASW particles is an ASW powder having the following composition: 5 wt % to 40 wt % asphalt based on a total weight of the ASW powder, and 60 wt % to 95 wt % of limestone, granules, and impurities based on the total weight of the ASW powder, wherein the method does not comprise a wet extraction step.

Some embodiments of the present disclose relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 150 microns to 450 microns; and a fifth set of ASW particles, wherein the fifth set of ASW particles has an average particle size of 2 microns to 150 microns; grinding the fourth set of ASW particles; wherein the grinding of the fourth set of ASW particles results in a sixth set of ASW particles, wherein the sixth set of ASW particles has an average particle size of 2 microns to 150 microns; wherein each of the fifth set of ASW particles and the sixth set of ASW particles is an ASW powder having the following composition: 5 wt % to 40 wt % asphalt based on a total weight of the ASW powder, and 60 wt % to 95 wt % of limestone, granules, and impurities based on the total weight of the ASW powder, wherein the method does not comprise a wet extraction step.

In some embodiments, the rotary screener is a trommel screener.

In some embodiments, the method does not comprise a grinding step after the step of grinding the fourth set of ASW particles.

In some embodiments, the method does not comprise any grinding steps other than the steps of: grinding the ASW, grinding the first set of ASW particles, and grinding the fourth set of ASW particles.

In some embodiments, the impurities comprise least one of: fiberglass mat sand, fines, marker paint, sealant, one or more adhesives, tape, plastic debris, paper debris, soil, woods, nails, or any combination thereof.

In some embodiments, the method does not comprise any steps of screening with a vibratory screener.

In some embodiments, the method does not comprise any steps of screening with a screening device that comprises at least one ball tray.

In some embodiments, the method does not comprise any steps of screening with a sizing shaker.

In some embodiments, the method does not comprise a screening step after the step of separating the second and third sets of ASW particles using the air separator.

In some embodiments, the second and third sets of ASW particles are combined prior to the step of separating the second and third sets of ASW particles using the air separator.

In some embodiments, the fifth set of ASW particles and the sixth set of ASW particles are combined to form the ASW powder.

In some embodiments, the method further comprises forming the ASW powder into a plurality of briquettes.

In some embodiments, forming the ASW powder into the plurality of briquettes comprises adding limestone powder to the ASW powder.

In some embodiments, forming the ASW powder into the plurality of briquettes comprises compressing the ASW powder at a pressure sufficient to form the plurality of briquettes.

In some embodiments, the pressure sufficient to form the plurality of briquettes ranges from 200 psi to 20,000 psi.

In some embodiments, each briquette of the plurality of briquettes is an oblate spheroid.

In some embodiments, each briquette of the plurality of briquettes has a first diameter and a second diameter, wherein at least one of: the first diameter, the second diameter, or any combination thereof ranges from 0.5 inches to 2 inches.

In some embodiments, the at least one granule liberator comprises a rotary impact separator.

In some embodiments, the method further comprises using a scalping screen to separate particles having an average particle size of 4 microns to 425 microns from the ground ASW.

In some embodiments, the step of using the scalping screen is performed between the steps of: grinding the ASW and screening the ground ASW.

In some embodiments, the method comprises deagglomerating the ground ASW using a lump breaker.

In some embodiments, the step of deagglomerating the ground ASW is performed between the steps of: grinding the ASW and screening the ground ASW.

Some embodiments of the present disclosure relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of: the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles have an average particle size of 2 microns to 250 microns; grinding the fourth set of ASW particles; wherein the grinding of the fourth set of ASW particles results in a sixth set of ASW particles, wherein the sixth set of ASW particles have an average particle size of 2 microns to 250 microns; wherein each of the fifth set of ASW particles and the sixth set of ASW particles is an ASW powder having the following composition: 5 wt % to 40 wt % asphalt based on a total weight of the ASW powder, and 60 wt % to 95 wt % of limestone, granules, and impurities based on the total weight of the ASW powder; forming the ASW powder into the plurality of briquettes; wherein the method does not comprise a wet extraction step.

Some embodiments of the present disclosure relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of: the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles have an average particle size of 2 microns to 250 microns; grinding the fourth set of ASW particles; wherein the grinding of the fourth set of ASW particles results in a sixth set of ASW particles, wherein the sixth set of ASW particles has an average particle size of 2 microns to 250 microns; wherein at least one of: the second set of ASW particles, the third set of ASW particles, the fourth set of ASW particles, the fifth set of ASW particles, the sixth set of ASW particles or any combination thereof comprises an ASW powder having the following composition: 5 wt % to 40 wt % asphalt based on a total weight of the ASW powder, and 60 wt % to 95 wt % of limestone, granules, and impurities based on the total weight of the ASW powder, obtaining the ASW powder from at least one of: the second set of ASW particles, the third set of ASW particles, the fourth set of ASW particles, the fifth set of ASW particles, the sixth set of ASW particles, or any combination thereof, wherein the ASW powder has an average particle size of 2 microns to 425 microns; feeding a sufficient amount of the ASW powder and a sufficient amount of an asphalt coating into at least one first mixer to form a mixture of the ASW powder and the asphalt coating; wherein the mixture of the ASW powder and the asphalt coating has the following composition: 0.1 wt % to 50 wt % ASW powder based on a total weight of the mixture, and 50 wt % to 99.9 wt % of the asphalt coating based on a total weight of the mixture; heating the mixture of the ASW powder and the asphalt coating to form a heated mixture; wherein the heated mixture has a temperature in a range of 400° F. to 500° F.; conveying the heated mixture of the ASW powder and the asphalt coating to at least one second mixer; mixing a sufficient amount of at least one filler material with the heated mixture in the second mixer to obtain an ASW powder filled coating; wherein the ASW powder filled coating has the following composition: 30 wt % to 50 wt % asphalt based on the total weight of the ASW powder filled coating, and 50 wt % to 70 wt % of: limestone powder, granules, impurities, and the at least one filler material based on the total weight of the ASW powder filled coating.

Some embodiments of the present disclosure relate to a method comprising: obtaining asphalt shingle waste (ASW), wherein the ASW comprises: asphalt, limestone, granules, and impurities; grinding the ASW to form ground ASW; screening the ground ASW with a rotary screener, wherein the screening of the ground ASW with the rotary screener results in: a first set of ASW particles, wherein the first set of ASW particles has an average particle size of 425 microns to 6350 microns, and a second set of ASW particles, wherein the second set of ASW particles has an average particle size of 2 microns to 425 microns; removing at least some of the granules from at least one of: the first set of ASW particles, the second set of ASW particles, or a combination thereof with a granule liberator; grinding the first set of ASW particles, wherein the grinding of the first set of ASW particles results in a third set of ASW particles, wherein the third set of ASW particles has an average particle size of 2 microns to 425 microns; separating the second and third sets of ASW particles using an air separator, wherein the separating using the air separator results in: a fourth set of ASW particles, wherein the fourth set of ASW particles have an average particle size of 250 microns to 450 microns; and a fifth set of ASW particles, wherein the fifth set of ASW particles have an average particle size of 2 microns to 250 microns; grinding the fourth set of ASW particles; wherein the grinding of the fourth set of ASW particles results in a sixth set of ASW particles, wherein the sixth set of ASW particles has an average particle size of 2 microns to 250 microns; wherein at least one of: the second set of ASW particles, the third set of ASW particles, the fourth set of ASW particles, the fifth set of ASW particles, the sixth set of ASW particles or any combination thereof comprises an ASW powder having the following composition: 5 wt % to 40 wt % asphalt based on a total weight of the ASW powder, and 60 wt % to 95 wt % of limestone, granules, and impurities based on the total weight of the ASW powder, obtaining the ASW powder from at least one of: the second set of ASW particles, the third set of ASW particles, the fourth set of ASW particles, the fifth set of ASW particles, the sixth set of ASW particles, or any combination thereof, wherein the ASW powder has an average particle size of 2 microns to 425 microns; forming the ASW powder into a plurality of briquettes; feeding a sufficient amount of the plurality of briquettes and a sufficient amount of an asphalt coating into at least one first mixer to form a mixture of the ASW powder and the asphalt coating; wherein the mixture of the ASW powder and the asphalt coating has the following composition: 0.1 wt % to 50 wt % ASW powder based on a total weight of the mixture, and 50 wt % to 99.9 wt % of the asphalt coating based on a total weight of the mixture; heating the mixture of the ASW powder and the asphalt coating to form a heated mixture; wherein the heated mixture has a temperature in a range of 400° F. to 500° F.; conveying the heated mixture of the ASW powder and the asphalt coating to at least one second mixer; mixing a sufficient amount of at least one filler material with the heated mixture in the second mixer to obtain an ASW powder filled coating; wherein the ASW powder filled coating has the following composition: 30 wt % to 50 wt % asphalt based on the total weight of the ASW powder filled coating, and 50 wt % to 70 wt % of: limestone powder, granules, impurities, and the at least one filler material based on the total weight of the ASW powder filled coating.

Some embodiments of the present disclosure relate to a method comprising: obtaining asphalt shingle waste (ASW), wherein the ASW comprises: asphalt, limestone powder, granules, and impurities; performing sufficient grinding steps and screening steps on the ASW to result in ASW powder having an average particle size of 2 microns to 425 microns and the following composition: 5 wt % to 40 wt % asphalt based on a total weight of the ASW powder, 60 wt % to 95 wt % limestone powder, granules, and impurities based on the total weight of the ASW powder; wherein the grinding steps and screening steps do not comprise wet extraction steps; feeding a sufficient amount of the ASW powder and a sufficient amount of an asphalt coating into at least one first mixer to form a mixture of the ASW powder and the asphalt coating; wherein the mixture of the ASW powder and the asphalt coating has the following composition: 0.1 wt % to 50 wt % powder based on a total weight of the mixture, and 50 wt % to 99.9 wt % of the asphalt coating based on a total weight of the mixture; heating the mixture of the ASW powder and the asphalt coating to form a heated mixture; wherein the heated mixture has a temperature in a range of 400° F. to 500° F.; conveying the heated mixture of the ASW powder and the asphalt coating to at least one second mixer; mixing a sufficient amount of at least one filler material with the heated mixture in the at least one second mixer to obtain an ASW powder filled coating; wherein the ASW powder filled coating has the following composition: 30 wt % to 50 wt % asphalt based on the total weight of the ASW powder filled coating, and 50 wt % to 70 wt % of: limestone powder, granules, impurities, and the at least one filler material based on the total weight of the ASW powder filled coating.

In some embodiments, the impurities comprise at least one of: fiberglass mat, sand, fines, marker paint, sealant, one or more adhesives, tape, plastic debris, paper debris, soil, woods, nails, or any combination thereof.

In some embodiments, the at least one filler material is limestone powder; and wherein the ASW powder filled coating has the following composition: 30% to 50% asphalt based on the total weight of the ASW powder filled coating, and 50% to 70% of: limestone powder, granules, and impurities based on the total weight of the ASW powder filled coating.

In some embodiments, the ASW powder filled coating is applied to a fiberglass mat to form a coated fiberglass mat.

In some embodiments, at least one of granules or sand are applied to the coated fiberglass mat to form an asphalt shingle.

In some embodiments, the ASW consists essentially of: asphalt, limestone powder, granules, and impurities.

In some embodiments, the ASW powder has the following composition: 25 wt % to 30 wt % asphalt based on a total weight of the ASW powder; 70 wt % to 75 wt % limestone powder, granules, and impurities based on the total weight of the ASW powder.

In some embodiments, the asphalt coating comprises at least one of: oxidized asphalt coating, polymer modified asphalt coating, or mixtures thereof.

In some embodiments, the polymer modified asphalt coating is poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

In some embodiments, the weight percentage of asphalt in the ASW powder filled coating, based on the total weight of the ASW powder filled coating, is the same as a weight percentage of asphalt in a powder filled coating that does not contain any ASW.

In some embodiments, the mixture of the ASW powder and the asphalt coating is not subjected to grinding or screening steps.

In some embodiments, the ASW powder filled coating comprises 1 wt % to 40 wt % of the ASW powder based on the total weight of the ASW powder filled coating.

In some embodiments, the method further comprises, after performing sufficient grinding steps and screening steps on the ASW to result in the ASW powder, forming the ASW powder into a plurality of briquettes.

In some embodiments, during the step of feeding the sufficient amount of the ASW powder and the sufficient amount of an asphalt coating into the at least one first mixer, at least a portion of the ASW powder takes the form of a plurality of briquettes.

In some embodiments, the ASW powder filled coating has a viscosity of 100 cP to 20,000 cP.

Some embodiments of the present disclosure relate to a method comprising: obtaining asphalt containing (AC) powder; wherein the AC powder has an average particle size of 2 microns to 425 microns; wherein the AC powder comprises ASW powder; wherein the AC powder has the following composition: 5 wt % to 40 wt % asphalt based on a total weight of the AC powder, 60 wt % to 95 wt % limestone powder, granules, and impurities based on the total weight of the AC powder; feeding a sufficient amount of the AC powder and a sufficient amount of an asphalt coating into at least one first mixer to form a mixture of the AC powder and the asphalt coating; wherein the mixture of the AC powder and the asphalt coating has the following composition: 0.1 wt % to 50 wt % of AC powder based on a total weight of the mixture, and 50 wt % to 99.9 wt % of the asphalt coating based on a total weight of the mixture; heating the mixture of the AC powder and the asphalt coating to form a heated mixture; wherein the heated mixture has a temperature in a range of 400° F. to 500° F.; conveying the heated mixture of the AC powder and the asphalt coating to at least one second mixer; mixing a sufficient amount of at least one filler material with the heated mixture in the second mixer to obtain an AC powder filled coating; wherein the AC powder filled coating has the following composition: 30 wt % to 50 wt % asphalt based on the total weight of the AC powder filled coating, and 50 wt % to 70 wt % of: limestone powder, granules, impurities, and the at least one filler material based on the total weight of the AC powder filled coating.

In some embodiments, the AC powder filled coating has a viscosity of 100 cP to 20,000 cP.

Some embodiments of the present disclosure relate to a method comprising: obtaining a plurality of briquettes, wherein each briquette of the plurality of briquettes comprises asphalt containing (AC) powder, asphalt shingle waste (ASW) powder, or any combination thereof; wherein the AC powder, the ASW powder, or combination thereof has an average particle size of 2 microns to 425 microns and the following composition: 5 wt % to 40 wt % asphalt based on a total weight of the AC powder, the ASW powder, or any combination thereof, 60 wt % to 95 wt % limestone powder, granules, and impurities based on the total weight of the AC powder, the ASW powder, or any combination thereof; feeding a sufficient amount of the briquettes and a sufficient amount of an asphalt coating into at least one first mixer to form a mixture of: the AC powder, the ASW powder, or combination thereof; and the asphalt coating wherein the mixture of: the AC powder, the ASW powder, or combination thereof; and the asphalt coating has the following composition: 0.1 wt % to 50 wt % of the AC powder, the ASW powder, or combination thereof based on a total weight of the mixture; and 50 wt % to 99.9 wt % of the asphalt coating based on a total weight of the mixture; heating the mixture of: the AC powder, the ASW powder, or combination thereof; and the asphalt coating to form a heated mixture; wherein the heated mixture has a temperature in a range of 400° F. to 500° F.; conveying the heated mixture of the AC powder, the ASW powder, or combination thereof and the asphalt coating to at least one second mixer; mixing a sufficient amount of at least one filler material with the heated mixture in the second mixer to obtain an AC powder filled coating, an ASW powder filled coating or combination thereof; wherein the AC powder filled coating, the ASW powder filled coating, or combination thereof has the following composition: 30 wt % to 50 wt % asphalt based on the total weight of the AC powder filled coating, the ASW powder filled coating, or combination thereof, and 50 wt % to 70 wt % of: limestone powder, granules, impurities, and the at least one filler material based on the total weight of the AC powder filled coating, the ASW powder filled coating, or combination thereof.

In some embodiments, obtaining the plurality of briquettes comprises: performing sufficient grinding steps and screening steps on ASW to result in ASW powder; and compressing the ASW powder at a pressure sufficient to form the plurality of briquettes.

In some embodiments, obtaining the plurality of briquettes further comprises adding at least one of: limestone powder, at least one other filler, AC powder, or any combination thereof to the ASW powder.

In some embodiments, the pressure sufficient to form the plurality of briquettes ranges from 200 psi to 20,000 psi.

BRIEF DESCRIPTION OF THE DRAWINGS

Some embodiments of the disclosure are herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
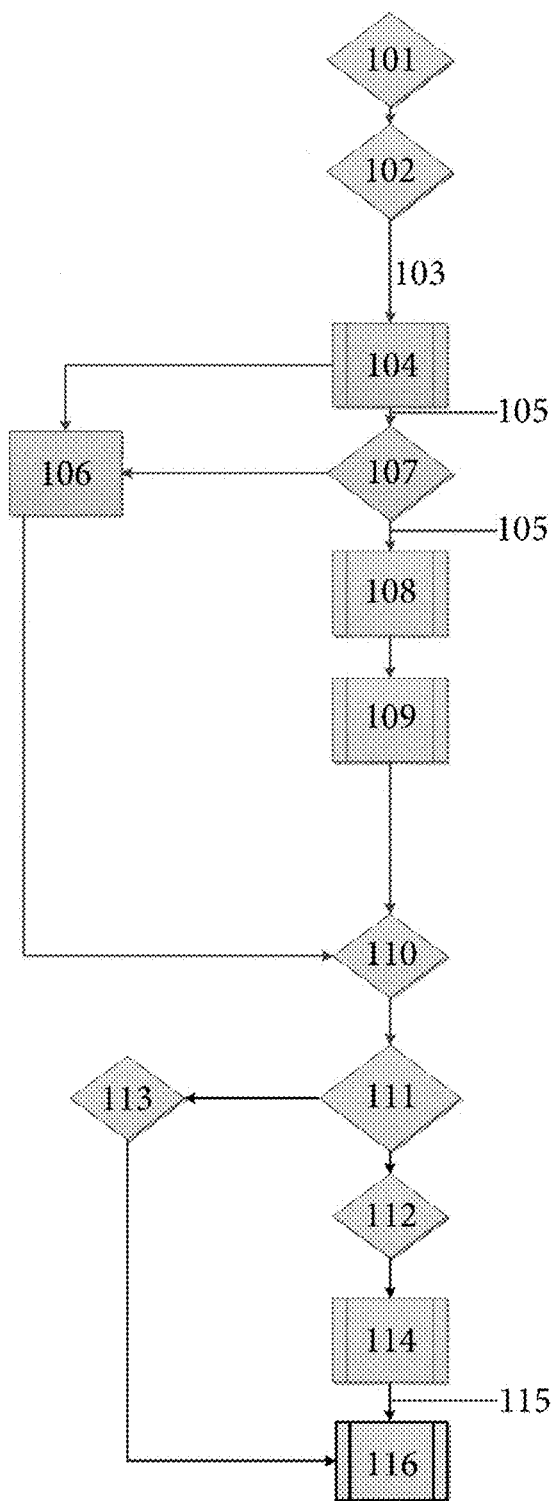
FIG. 1 is a flow diagram depicting an exemplary method of forming asphalt shingle waste (ASW) powder from asphalt shingle waste (ASW).

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

All prior patents, publications, and test methods referenced herein are incorporated by reference in their entireties.

Definitions

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, "asphalt shingle waste" is defined as any form of discarded asphalt shingle. "Asphalt shingle waste" includes, but is not limited to, post-manufacturing waste and post-consumer waste.

As used herein "post-consumer waste" is defined as any waste produced by an end consumer of a material stream. A non-limiting example of "post-consumer waste" is a discarded roofing shingle from a residential or commercial roof. Another non-limiting example of "post-consumer waste" is contractor waste including, but not limited to, surplus new material, damaged material, and scrap from cut shingles during installation. Yet another non-limiting example of "post-consumer waste" is at least one of: distributor waste, retail waste, or any combination thereof, including, but not limited to, damaged shingle products, aged inventory of shingles, and customer returns.

As used herein, "post-manufacturing waste" is defined as waste produced prior to reaching the end consumer of a material stream. A non-limiting example of "post-manufacturing waste" is any shingle waste generated during the production, handling, transportation or other method of generation prior to installation on a roof of a consumer. Post-manufacturing waste may include production waste such as, but not limited to, partial shingles and coated fiberglass mat with or without granules.

As used herein "grinding" is the reduction of particles by size. Non-limiting examples of grinding include, but are not limited to, crushing, shredding, chopping, milling (e.g., hammermilling), the like, and combinations thereof.

As used herein, "screening" is the separation of particles by size. Non-limiting examples of screening include, but are not limited to, vibratory screening, rotary screening, the like, and combinations thereof.

As used herein a "screener" is a screening device that is configured to perform at least one screening step.

As used herein, a "rotary screener" is any type of screening device that separates particles by size through rotation of at least a portion of the screening device.

As used herein, a "trommel screener" is a rotary screening device that includes a rotating drum. Trommel screeners are not vibratory screeners. In some embodiments, a trommel screener separates particles by size as the particles pass through the rotating drum. In some embodiments, particles that are smaller than openings in the drum fall through the openings. In some embodiments, particles that are larger than the openings in the drum do not fall through the openings.

As used herein, a "vibratory screener" is any type of screening device that separates particles by size through vibration of at least a portion of the screening device.

As used herein a "sizing shaker" is a type of vibratory screener that includes at least one vibrating tray. In some embodiments, a sizing shaker separates particles by size as the at least one vibrating tray vibrates. In some embodiments, particles that are smaller than openings in the tray fall through the openings. In some embodiments, particles that are larger than the openings in the tray do not fall through the openings. In some embodiments, a sizing shaker includes at least one ball tray.

As used herein a "ball tray" is a tray that includes balls within one or more compartments of the tray. In some embodiments, at least one ball tray may be placed underneath the at least one vibrating tray of a vibratory screener (e.g., a sizing shaker) to reduce clogging of particles within the openings of the tray. In some embodiments, as the at least one vibrating tray vibrates, the balls of the at least one ball tray strike an underside of the vibrating tray, thereby dislodging the clogged particles.

As used herein, an "air separator" is a device configured to receive a suspension of particles in air and separate the particles by at least one of, size, density or a combination thereof. In some embodiments, an "air separator" may include at least one of a "cyclone air separator" or a "mechanical air separator." In some embodiments, a "cyclone air separator" can operate in a vertically oriented configuration (i.e., with a top of the cyclone air separator pointing towards the sky and with a bottom of the cyclone air separator pointing towards the ground). In some embodiments, the suspension of particles may be introduced into a chamber, such that flow of the suspension into the chamber creates a spiral vortex. In some embodiments, a "mechanical air separator" includes one or more spinning blades (e.g., centrifugally rotating blades). In some embodiments, a fraction of particles from the suspension pass through the spinning blades, while a remainder of the particles from the suspension do not pass through the plurality of spinning blades.

As used herein, "wet extraction steps" are steps that include, but are not limited to, at least one of: the introduction of a solvent into a mixture of particles, the formation of a liquid from a mixture of particles, or any combination thereof.

As used herein, "dry grinding steps" are grinding steps that do not include wet extraction steps.

As used herein, "average particle size" is defined as "the smallest size sieve openings according to the U.S. Standard Test Sieve Series where 90% of the particles pass through the sieve." For example, particles having an average particle size of 425 microns means at least 90% of the particles pass through a 40 U.S. Standard Test Sieve having 425 micron sieve openings and less than 90% of the particles pass through a 45 U.S. Standard Test Sieve having 355 micron sieve openings.

As used herein, "a granule liberator" is any device configured to separate granules from a mixture of particles, a powder, or any combination thereof. A non-limiting example of a granule liberator is a rotary impact separator (RIS). Other non-limiting examples of granule liberators include any size separation device described herein, or any density separation device described herein.

As used herein, a "rotary impact separator" is a device having rotating elements attached to a central shaft, such that the device is configured to impact feed material. In some embodiments, the rotating elements may include, but are not limited to paddles, chains, knives, or other shapes. In some embodiments, the rotating elements may be located at one or more locations along the central shaft to facilitate impact of the feed material. In some embodiments, the rotary impact separator may further include screens on at least one of the bottom or the sides of the unit to collect the impacted material. In some embodiments, after collection, the impacted material exits the rotary impact separator via an exit chute or equivalent. In some embodiments, the rotary impact separator may further include dams, baffles, breakers, and adjustable gates. In some embodiments, the rotary impact separator can also be used to help control flow and residence time of the material within the unit. A non-limiting example of a rotary impact separator according to certain embodiments is shown in U.S. Patent Application Publication No. 2017/0305038, which is incorporated by reference in its entirety.

As used herein, a "powder" is a mixture of particles produced by size reduction steps including, but not limited to, grinding, crushing, or disintegration, the like, or any combination thereof, of a solid substance.

As used herein, "asphalt shingle waste (ASW) powder" is a mixture of particles produced by size reduction steps including, but not limited to, grinding, crushing, or disintegration, the like, or any combination thereof, of asphalt shingle waste.

As used herein, a "scalping screen" is a screening device comprising a series of conveyor belts. In some embodiments, the scalping screen is configured to receive particles in various sizes and stockpile resulting screened particles off one or more ends of the conveyor belts.

As used herein, a "lump breaker" is any device configured to de-agglomerate particles.

As used herein, the term "briquette" broadly refers to any solid agglomeration of particles that includes ASW powder, AC powder (as defined herein, infra), or any combination thereof. In some embodiments, a briquette may include a binding agent. In some embodiments, a briquette may exclude binding agents. In some embodiments, in any method step where an ASW powder, an AC powder, or any combination thereof is used, the ASW powder, an AC powder, or any combination thereof may be partially or completely replaced with a plurality of briquettes.

As used herein the term "briquetting" refers to any process of forming a briquette. In some embodiments, a briquetting process may include the addition of a binding agent. In some embodiments, a briquetting process may exclude addition of any binding agents.

As used herein, "wet extraction steps" are steps that include, but are not limited to, at least one of: the introduction of a solvent into a mixture of particles, the formation of a liquid from a mixture of particles, or any combination thereof.

As used herein, "asphalt coating" is defined as any form of processed asphalt, where "processed asphalt" is formed by subjecting asphalt to at least one processing step. The at least one processing step can include, but is not limited to, oxidation, dehydrogenation, condensation, polymerization, the like, or any combination thereof.

As used herein, "asphalt containing (AC) powder" is a mixture of particles produced by size reduction steps including, but not limited to, grinding, crushing, or disintegration, the like, or any combination thereof, of at least one asphalt containing composition. Examples of AC powder include, but are not limited to, ASW powder, powders formed from processed asphalt, powders formed from unprocessed asphalt, or any combination or mixture thereof.

As used herein, "oxidized asphalt coating" is defined as a form of processed asphalt that is created by oxidizing asphalt. A non-limiting example of an oxidation procedure is air-blowing, in which air is blown into asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein, "polymer modified asphalt coating" is defined as a form of processed asphalt that is created by adding at least one polymer to asphalt. A non-limiting example of a polymer modification procedure is emulsification, in which at least one polymer is mixed with asphalt at a sufficient temperature (e.g., from 250° F. to 350° F.) to form an emulsion. Other non-limiting examples of polymer modification procedures are described in U.S. Pat. No. 8,901,211, which is incorporated by reference in its entirety. In yet other embodiments, the polymer forms a colloid suspension, colloid solution, or dispersion with the asphalt.

As used herein, "softening point" is the temperature at which a material softens beyond a predetermined reference softness. Softening point is measured herein according to ASTM-D-3461.

As used herein, "penetration point" is the vertical distance penetrated by the point of a standard needle into asphalt under specific conditions of load, time and temperature. Penetration point is measured herein according to ASTM D-5.

As used herein, "viscosity" is a measure of a fluid's resistance to flow at a given shear rate and temperature. Viscosity is measured herein in accordance with ASTM D-4402 by using a Brookfield LVT viscometer at 400° F. with a #31 spindle at 30 RPM.

Exemplary Methods of Processing Asphalt Shingle Waste (ASW)

Some embodiments of the present disclosure relate to methods of processing asphalt shingle waste (ASW).

In some embodiments, an exemplary method according to the present disclosure includes obtaining ASW. In some embodiments, the ASW comprises asphalt, limestone, granules, and impurities. In some embodiments, the ASW consists essentially of asphalt, limestone, granules, and impurities. In some embodiments, the ASW consists of asphalt, limestone, granules, and impurities. In some embodiments, the impurities comprise least one of: fiberglass mat sand, fines, marker paint, sealant, one or more adhesives, tape, plastic debris, paper debris, soil, woods, nails, or any combination thereof.

In some embodiments, an exemplary method according to the present disclosure comprises a step of grinding the ASW to form ground ASW. In some embodiments, the ground ASW may be stored for a period of time. In some such embodiments, the ground ASW may agglomerate. In some such embodiments, the ASW may be deagglomerated using a lump breaker.

In some embodiments, a portion of the ground ASW may have a sufficiently small particle size, such that this portion of the ground ASW may be fed directly to a downstream step of an exemplary method described herein. Put differently. In some embodiments, the portion of the ground ASW having the sufficiently small particle size may "skip" one or more downstream grinding or separation steps detailed herein. In some of such embodiments, the portion of the ground ASW that is sufficiently small in size may be separated from a remainder of the ground ASW using a scalping screen.

In some non-limiting embodiments, the sufficiently small size corresponds to an average particle size ranging from 2 microns to 425 microns. In some non-limiting embodiments, the sufficiently small size corresponds to an average particle size ranging from 5 microns to 425 microns. In some non-limiting embodiments, the sufficiently small size corresponds to an average particle size ranging from 10 microns to 425 microns. In some non-limiting embodiments, the sufficiently small size corresponds to an average particle size ranging from 25 microns to 425 microns. In some non-limiting embodiments, the sufficiently small size corresponds to an average particle size ranging from 50 microns to 425 microns. In some non-limiting embodiments, the sufficiently small size corresponds to an average particle size ranging from 100 microns to 425 microns. In some non-limiting embodiments, the sufficiently small size corresponds to an average particle size ranging from 200 microns to 425 microns. In some non-limiting embodiments, the sufficiently small size corresponds to an average particle size ranging from 300 microns to 425 microns. In some non-limiting embodiments, the sufficiently small size corresponds to an average particle size ranging from 400 microns to 425 microns.

In some non-limiting embodiments, the sufficiently small size corresponds to an average particle size ranging from 2 microns to 400 microns. In some non-limiting embodiments, the sufficiently small size corresponds to an average particle size ranging from 2 microns to 300 microns. In some non-limiting embodiments, the sufficiently small size corresponds to an average particle size ranging from 2 microns to 200 microns. In some non-limiting embodiments, the sufficiently small size corresponds to an average particle size ranging from 2 microns to 100 microns. In some non-limiting embodiments, the sufficiently small size corresponds to an average particle size ranging from 2 microns to 50 microns. In some non-limiting embodiments, the sufficiently small size corresponds to an average particle size ranging from 2 microns to 25 microns. In some non-limiting embodiments, the sufficiently small size corresponds to an average particle size ranging from 2 microns to 10 microns. In some non-limiting embodiments, the sufficiently small size corresponds to an average particle size ranging from 2 microns to 5 microns.

In some non-limiting embodiments, the sufficiently small size corresponds to an average particle size ranging from 5 microns to 400 microns. In some non-limiting embodiments, the sufficiently small size corresponds to an average particle size ranging from 10 microns to 300 microns. In some non-limiting embodiments, the sufficiently small size corresponds to an average particle size ranging from 25 microns to 200 microns. In some non-limiting embodiments, the sufficiently small size corresponds to an average particle size ranging from 50 microns to 100 microns.

In some embodiments, an exemplary method according to the present disclosure comprises screening the ground ASW with a rotary screener. In some embodiments, the rotary screener is a trommel screener. In some embodiments, an exemplary method according to the present disclosure does not comprise any steps of screening with a vibratory screener. In some embodiments, an exemplary method according to the present disclosure does not comprise any steps of screening with a screening device that comprises at least one ball tray. In some embodiments, an exemplary method according to the present disclosure does not comprise any steps of screening with a sizing shaker.

In some embodiments, the screening of the ground ASW with the rotary screener results in a first set of ASW particles and a second set of ASW particles.

In some embodiments, the first set of ASW particles has an average particle size of 425 microns to 6350 microns. In some embodiments, the first set of ASW particles has an average particle size of 500 microns to 6350 microns. In some embodiments, the first set of ASW particles has an average particle size of 750 microns to 6350 microns. In some embodiments, the first set of ASW particles has an average particle size of 1000 microns to 6350 microns. In some embodiments, the first set of ASW particles has an average particle size of 2000 microns to 6350 microns. In some embodiments, the first set of ASW particles has an average particle size of 5000 microns to 6350 microns. In some embodiments, the first set of ASW particles has an average particle size of 6000 microns to 6350 microns.

In some embodiments, the first set of ASW particles has an average particle size of 425 microns to 6000 microns. In some embodiments, the first set of ASW particles has an average particle size of 425 microns to 5000 microns. In some embodiments, the first set of ASW particles has an average particle size of 425 microns to 2000 microns. In some embodiments, the first set of ASW particles has an average particle size of 425 microns to 1000 microns. In some embodiments, the first set of ASW particles has an average particle size of 425 microns to 750 microns. In some embodiments, the first set of ASW particles has an average particle size of 425 microns to 500 microns.

In some embodiments, the first set of ASW particles has an average particle size of 500 microns to 6000 microns. In some embodiments, the first set of ASW particles has an average particle size of 750 microns to 5000 microns. In some embodiments, the first set of ASW particles has an average particle size of 1000 microns to 2000 microns.

In some embodiments, the second set of ASW particles has an average particle size of 2 microns to 425 microns. In some embodiments, the second set of ASW particles has an average particle size of 5 microns to 425 microns. In some embodiments, the second set of ASW particles has an average particle size of 10 microns to 425 microns. In some embodiments, the second set of ASW particles has an average particle size of 25 microns to 425 microns. In some embodiments, the second set of ASW particles has an average particle size of 50 microns to 425 microns. In some embodiments, the second set of ASW particles has an average particle size of 75 microns to 425 microns. In some embodiments, the second set of ASW particles has an average particle size of 100 microns to 425 microns. In some embodiments, the second set of ASW particles has an average particle size of 200 microns to 425 microns. In some embodiments, the second set of ASW particles has an average particle size of 300 microns to 425 microns. In some embodiments, the second set of ASW particles has an average particle size of 400 microns to 425 microns.

In some embodiments, the second set of ASW particles has an average particle size of 2 microns to 400 microns. In some embodiments, the second set of ASW particles has an average particle size of 2 microns to 300 microns. In some embodiments, the second set of ASW particles has an average particle size of 2 microns to 200 microns. In some embodiments, the second set of ASW particles has an average particle size of 2 microns to 100 microns. In some embodiments, the second set of ASW particles has an average particle size of 2 microns to 75 microns. In some embodiments, the second set of ASW particles has an average particle size of 2 microns to 50 microns. In some embodiments, the second set of ASW particles has an average particle size of 2 microns to 25 microns. In some embodiments, the second set of ASW particles has an average particle size of 2 microns to 10 microns. In some embodiments, the second set of ASW particles has an average particle size of 2 microns to 5 microns.

In some embodiments, the second set of ASW particles has an average particle size of 5 microns to 400 microns. In some embodiments, the second set of ASW particles has an average particle size of 10 microns to 300 microns. In some embodiments, the second set of ASW particles has an average particle size of 25 microns to 200 microns. In some embodiments, the second set of ASW particles has an average particle size of 75 microns to 100 microns.

In some embodiments, the first set of ASW particles has an average particle size that is greater than the average particle size of the second set of ASW particles.

In some embodiments, an exemplary method according to the present disclosure includes removing at least some of the granules from at least one of the first set of ASW particles, the second set of ASW particles, or a combination thereof with a at least one granule liberator such as, but not limited to at least one rotary impact separator. In some embodiments, an exemplary method according to the present disclosure includes removing all the granules from at least one of the first set of ASW particles, the second set of ASW particles, or a combination thereof with an RIS.

In some embodiments, an exemplary method according to the present disclosure includes removing 20% to 95% of the granules from at least one of the first set of ASW particles, the second set of ASW particles, or a combination thereof with at least one granule liberator. In some embodiments, an exemplary method according to the present disclosure includes removing 40% to 95% of the granules from at least one of the first set of ASW particles, the second set of ASW particles, or a combination thereof with at least one granule liberator. In some embodiments, an exemplary method according to the present disclosure includes removing 60% to 95% of the granules from at least one of the first set of ASW particles, the second set of ASW particles, or a combination thereof with at least one granule liberator. In some embodiments, an exemplary method according to the present disclosure includes removing 80% to 95% of the granules from at least one of the first set of ASW particles, the second set of ASW particles, or a combination thereof with at least one granule liberator. In some embodiments, an exemplary method according to the present disclosure includes removing 90% to 95% of the granules from at least one of the first set of ASW particles, the second set of ASW particles, or a combination thereof with at least one granule liberator.

In some embodiments, an exemplary method according to the present disclosure includes removing 20% to 90% of the granules from at least one of the first set of ASW particles, the second set of ASW particles, or a combination thereof with at least one granule liberator. In some embodiments, an exemplary method according to the present disclosure includes removing 20% to 80% of the granules from at least one of the first set of ASW particles, the second set of ASW particles, or a combination thereof with at least one granule liberator. In some embodiments, an exemplary method according to the present disclosure includes removing 20% to 60% of the granules from at least one of the first set of ASW particles, the second set of ASW particles, or a combination thereof with at least one granule liberator. In some embodiments, an exemplary method according to the present disclosure includes removing 20% to 40% of the granules from at least one of the first set of ASW particles, the second set of ASW particles, or a combination thereof with at least one granule liberator.

In some embodiments, an exemplary method according to the present disclosure includes removing 40% to 90% of the granules from at least one of the first set of ASW particles, the second set of ASW particles, or a combination thereof with at least one granule liberator. In some embodiments, an exemplary method according to the present disclosure includes removing 60% to 80% of the granules from at least one of the first set of ASW particles, the second set of ASW particles, or a combination thereof with at least one granule liberator.

In some embodiments, an exemplary method according to the present disclosure includes removing at least some of the granules from at least one of the first set of ASW particles, the second set of ASW particles, or a combination thereof with two or more granule liberators. In some embodiments, the two or more granule liberators are operated in series. In yet other embodiments, the two or more granule liberators are operated in parallel.

In some embodiments, at least some of the ASW particles from at least one of the first set of ASW particles, the second set of ASW particles, or any combination thereof may remain in a mixture with the granules that are removed using at least one granule liberator. In such embodiments, at least some of the remaining ASW particles may be separated from the mixture using at least one density separation technique, at least one size separation technique, or any combination thereof. Non-limiting examples of the at least one density separation technique, the at least one size separation technique, or any combination thereof include any screening technique described herein, any air separation technique described herein (e.g., cyclone air separation, mechanical air separation), air classification, vacuum separation, the like, or any combination thereof.

In some embodiments, the at least one granule liberator may remove sand, fiberglass, backing, mat substrate, non-asphaltic materials, or any combination thereof.

In some embodiments, the at least one density separation technique, the at least one size separation technique, or any combination thereof may be used to remove at least some of the granules from at least one of the first set of ASW particles, the second set of ASW particles, or a combination thereof, in addition to or as an alternative granule liberation mechanism (i.e., other than the RIS). In some embodiments, a plurality of density separation techniques, a plurality of size separation techniques, or any combination thereof may be used to remove at least some of the granules from at least one of the first set of ASW particles, the second set of ASW particles, or a combination thereof.

In some embodiments, an exemplary method according to the present disclosure includes removing at least some of the granules from at least one of the first set of ASW particles, the second set of ASW particles, or a combination thereof with a plurality of density separation techniques, a plurality of size separation techniques, or any combination thereof. In embodiments, the plurality of density separation techniques, the plurality of size separation techniques, or any combination thereof are performed in series. In yet other embodiments, the plurality of density separation techniques, the plurality of size separation techniques, or any combination thereof are performed in parallel.

In some embodiments, at least some of the granules may be reused in roofing products. In some embodiments, at least some of the granules may be reused in manufacture of one or more roofing shingles or roofing shingle components. In some non-limiting embodiments, at least some of the granules may be reused for a headlap of a roofing shingle, a backing of a roofing shingle, or any combination thereof.

In some embodiments, the first set of ASW particles is subjected to a grinding step. In some embodiments, the step of grinding the first set of ASW particles results in a third set of ASW particles.

In some embodiments, the third set of ASW particles has an average particle size of 2 microns to 425 microns. In some embodiments, the third set of ASW particles has an average particle size of 5 microns to 425 microns. In some embodiments, the third set of ASW particles has an average particle size of 10 microns to 425 microns. In some embodiments, the third set of ASW particles has an average particle size of 25 microns to 425 microns. In some embodiments, the third set of ASW particles has an average particle size of 50 microns to 425 microns. In some embodiments, the third set of ASW particles has an average particle size of 75 microns to 425 microns. In some embodiments, the third set of ASW particles has an average particle size of 100 microns to 425 microns. In some embodiments, the third set of ASW particles has an average particle size of 200 microns to 425 microns. In some embodiments, the third set of ASW particles has an average particle size of 300 microns to 425 microns. In some embodiments, the third set of ASW particles has an average particle size of 400 microns to 425 microns.

In some embodiments, the third set of ASW particles has an average particle size of 2 microns to 400 microns. In some embodiments, the third set of ASW particles has an average particle size of 2 microns to 300 microns. In some embodiments, the third set of ASW particles has an average particle size of 2 microns to 200 microns. In some embodiments, the third set of ASW particles has an average particle size of 2 microns to 100 microns. In some embodiments, the third set of ASW particles has an average particle size of 2 microns to 75 microns. In some embodiments, the third set of ASW particles has an average particle size of 2 microns to 50 microns. In some embodiments, the third set of ASW particles has an average particle size of 2 microns to 25 microns. In some embodiments, the third set of ASW particles has an average particle size of 2 microns to 10 microns. In some embodiments, the third set of ASW particles has an average particle size of 2 microns to 5 microns.

In some embodiments, the third set of ASW particles has an average particle size of 5 microns to 400 microns. In some embodiments, the third set of ASW particles has an average particle size of 10 microns to 300 microns. In some embodiments, the third set of ASW particles has an average particle size of 25 microns to 200 microns. In some embodiments, the third set of ASW particles has an average particle size of 75 microns to 100 microns.

In some embodiments, the second set of ASW particles and the third set of ASW particles are combined to form a combination of the second and third sets of ASW particles. In some embodiments, the second set of ASW particles and the third set of ASW particles are not combined.

In some embodiments, the combination of the second and third sets of ASW particles are separated using an air separator. In some embodiments, each of the second set of ASW particles and the third set of ASW particles is individually separated using the air separator. In some embodiments, the air separator is a mechanical air separator. In some embodiments, the air separator is a cyclone air separator.

In some embodiments, the separating using the air separator results in a fourth set of ASW particles and a fifth set of ASW particles.

In some embodiments, the fourth set of ASW particles has an average particle size of 250 microns to 450 microns. In some embodiments, the fourth set of ASW particles has an average particle size of 300 microns to 450 microns. In some embodiments, the fourth set of ASW particles has an average particle size of 350 microns to 450 microns. In some embodiments, the fourth set of ASW particles has an average particle size of 400 microns to 450 microns.

In some embodiments, the fourth set of ASW particles has an average particle size of 250 microns to 400 microns. In some embodiments, the fourth set of ASW particles has an average particle size of 250 microns to 350 microns. In some embodiments, the fourth set of ASW particles has an average particle size of 250 microns to 300 microns.

In some embodiments, the fourth set of ASW particles has an average particle size of 300 microns to 400 microns.

In some embodiments, the fifth set of ASW particles has an average particle size of 2 microns to 250 microns. In some embodiments, the fifth set of ASW particles has an average particle size of 5 microns to 250 microns. In some embodiments, the fifth set of ASW particles has an average particle size of 10 microns to 250 microns. In some embodiments, the fifth set of ASW particles has an average particle size of 25 microns to 250 microns. In some embodiments, the fifth set of ASW particles has an average particle size of 50 microns to 250 microns. In some embodiments, the fifth set of ASW particles has an average particle size of 75 microns to 250 microns. In some embodiments, the fifth set of ASW particles has an average particle size of 100 microns to 250 microns. In some embodiments, the fifth set of ASW particles has an average particle size of 150 microns to 250 microns. In some embodiments, the fifth set of ASW particles has an average particle size of 200 microns to 250 microns.

In some embodiments, the fifth set of ASW particles has an average particle size of 2 microns to 200 microns. In some embodiments, the fifth set of ASW particles has an average particle size of 2 microns to 150 microns. In some embodiments, the fifth set of ASW particles has an average particle size of 2 microns to 100 microns. In some embodiments, the fifth set of ASW particles has an average particle size of 2 microns to 75 microns. In some embodiments, the fifth set of ASW particles has an average particle size of 2 microns to 50 microns. In some embodiments, the fifth set of ASW particles has an average particle size of 2 microns to 25 microns. In some embodiments, the fifth set of ASW particles has an average particle size of 2 microns to 10 microns. In some embodiments, the fifth set of ASW particles has an average particle size of 2 microns to 5 microns.

In some embodiments, the fourth set of ASW particles has an average particle size that is greater than the average particle size of the fifth set of ASW particles.

In some embodiments, an exemplary method according to the present disclosure includes grinding the fourth set of ASW particles. In some embodiments, the grinding of the fourth set of ASW particles results in a sixth set of ASW particles.

In some embodiments, the sixth set of ASW particles has an average particle size of 2 microns to 250 microns. In some embodiments, the sixth set of ASW particles has an average particle size of 5 microns to 250 microns. In some embodiments, the sixth set of ASW particles has an average particle size of 10 microns to 250 microns. In some embodiments, the sixth set of ASW particles has an average particle size of 25 microns to 250 microns. In some embodiments, the sixth set of ASW particles has an average particle size of 50 microns to 250 microns. In some embodiments, the sixth set of ASW particles has an average particle size of 75 microns to 250 microns. In some embodiments, the sixth set of ASW particles has an average particle size of 100 microns to 250 microns. In some embodiments, the sixth set of ASW particles has an average particle size of 150 microns to 250 microns. In some embodiments, the sixth set of ASW particles has an average particle size of 200 microns to 250 microns.

In some embodiments, the sixth set of ASW particles has an average particle size of 2 microns to 200 microns. In some embodiments, the sixth set of ASW particles has an average particle size of 2 microns to 150 microns. In some embodiments, the sixth set of ASW particles has an average particle size of 2 microns to 100 microns. In some embodiments, the sixth set of ASW particles has an average particle size of 2 microns to 75 microns. In some embodiments, the sixth set of ASW particles has an average particle size of 2 microns to 50 microns. In some embodiments, the sixth set of ASW particles has an average particle size of 2 microns to 25 microns. In some embodiments, the sixth set of ASW particles has an average particle size of 2 microns to 10 microns. In some embodiments, the sixth set of ASW particles has an average particle size of 2 microns to 5 microns.

In some embodiments, the fifth set of ASW particles and the sixth set of ASW particles are combined. In some embodiments, the fifth set of ASW particles and the sixth set of ASW particles are not combined.

In some embodiments, the combining of the fifth set of ASW particles and the sixth set of ASW particles results in an ASW powder. In some embodiments, each of the fifth set of ASW particles and the sixth set of ASW particles is an ASW powder.

In some embodiments, at least one of: the second set of ASW particles, the third set of ASW particles, the fourth set of ASW particles, the fifth set of ASW particles, the sixth set of ASW particles, or any combination thereof comprises the ASW powder. In some such embodiments, the ASW powder may be separated from at least one of: the second set of ASW particles, the third set of ASW particles, the fourth set of ASW particles, the fifth set of ASW particles, the sixth set of ASW particles or any combination thereof using any separation technique (e.g., screening, density separation, size separation) described herein or any combination of separation techniques described herein.

In some embodiments, the ASW powder is combined with an asphalt coating (e.g., an oxidized asphalt coating or a polymer modified asphalt coating) to form a partially filled asphalt coating. In some embodiments, limestone or at least one other filler material may be added to the partially filled asphalt coating to form a filled asphalt coating. In some embodiments, the filled asphalt coating is incorporated into a roofing shingle.

In some embodiments, the ASW powder comprises 5 wt % to 40 wt % asphalt based on a total weight of the ASW powder. In some embodiments, the ASW powder comprises 10 wt % to 40 wt % asphalt based on a total weight of the ASW powder. In some embodiments, the ASW powder comprises 15 wt % to 40 wt % asphalt based on a total weight of the ASW powder. In some embodiments, the ASW powder comprises 20 wt % to 40 wt % asphalt based on a total weight of the ASW powder. In some embodiments, the ASW powder comprises 25 wt % to 40 wt % asphalt based on a total weight of the ASW powder. In some embodiments, the ASW powder comprises 30 wt % to 40 wt % asphalt based on a total weight of the ASW powder. In some embodiments, the ASW powder comprises 35 wt % to 40 wt % asphalt based on a total weight of the ASW powder.

In some embodiments, the ASW powder comprises 5 wt % to 35 wt % asphalt based on a total weight of the ASW powder. In some embodiments, the ASW powder comprises 5 wt % to 30 wt % asphalt based on a total weight of the ASW powder. In some embodiments, the ASW powder comprises 5 wt % to 20 wt % asphalt based on a total weight of the ASW powder. In some embodiments, the ASW powder comprises 5 wt % to 15 wt % asphalt based on a total weight of the ASW powder. In some embodiments, the ASW powder comprises 5 wt % to 10 wt % asphalt based on a total weight of the ASW powder.

In some embodiments, the ASW powder comprises 10 wt % to 35 wt % asphalt based on a total weight of the ASW powder. In some embodiments, the ASW powder comprises 15 wt % to 30 wt % asphalt based on a total weight of the ASW powder. In some embodiments, the ASW powder comprises 20 wt % to 25 wt % asphalt based on a total weight of the ASW powder.

In some embodiments, the ASW powder comprises 60 wt % to 95 wt % of limestone, granules, and impurities based on the total weight of the ASW powder. In some embodiments, the ASW powder comprises 65 wt % to 95 wt % of limestone, granules, and impurities based on the total weight of the ASW powder. In some embodiments, the ASW powder comprises 70 wt % to 95 wt % of limestone, granules, and impurities based on the total weight of the ASW powder. In some embodiments, the ASW powder comprises 75 wt % to 95 wt % of limestone, granules, and impurities based on the total weight of the ASW powder. In some embodiments, the ASW powder comprises 80 wt % to 95 wt % of limestone, granules, and impurities based on the total weight of the ASW powder. In some embodiments, the ASW powder comprises 85 wt % to 95 wt % of limestone, granules, and impurities based on the total weight of the ASW powder. In some embodiments, the ASW powder comprises 90 wt % to 95 wt % of limestone, granules, and impurities based on the total weight of the ASW powder.

In some embodiments, the ASW powder comprises 60 wt % to 90 wt % of limestone, granules, and impurities based on the total weight of the ASW powder. In some embodiments, the ASW powder comprises 60 wt % to 85 wt % of limestone, granules, and impurities based on the total weight of the ASW powder. In some embodiments, the ASW powder comprises 60 wt % to 80 wt % of limestone, granules, and impurities based on the total weight of the ASW powder. In some embodiments, the ASW powder comprises 60 wt % to 75 wt % of limestone, granules, and impurities based on the total weight of the ASW powder. In some embodiments, the ASW powder comprises 60 wt % to 70 wt % of limestone, granules, and impurities based on the total weight of the ASW powder. In some embodiments, the ASW powder comprises 60 wt % to 65 wt % of limestone, granules, and impurities based on the total weight of the ASW powder.

In some embodiments, the ASW powder comprises 65 wt % to 90 wt % of limestone, granules, and impurities based on the total weight of the ASW powder. In some embodiments, the ASW powder comprises 70 wt % to 85 wt % of limestone, granules, and impurities based on the total weight of the ASW powder. In some embodiments, the ASW powder comprises 75 wt % to 80 wt % of limestone, granules, and impurities based on the total weight of the ASW powder.

In some embodiments, the ASW powder comprises 5 wt % to 40 wt % asphalt based on a total weight of the ASW powder with the remainder limestone, granules, and impurities. In some embodiments, the ASW powder comprises 10 wt % to 40 wt % asphalt based on a total weight of the ASW powder with the remainder limestone, granules, and impurities. In some embodiments, the ASW powder comprises 15 wt % to 40 wt % asphalt based on a total weight of the ASW powder with the remainder limestone, granules, and impurities. In some embodiments, the ASW powder comprises 20 wt % to 40 wt % asphalt based on a total weight of the ASW powder with the remainder limestone, granules, and impurities. In some embodiments, the ASW powder comprises 25 wt % to 40 wt % asphalt based on a total weight of the ASW powder with the remainder limestone, granules, and impurities. In some embodiments, the ASW powder comprises 30 wt % to 40 wt % asphalt based on a total weight of the ASW powder with the remainder limestone, granules, and impurities. In some embodiments, the ASW powder comprises 35 wt % to 40 wt % asphalt based on a total weight of the ASW powder with the remainder limestone, granules, and impurities.

In some embodiments, the ASW powder comprises 5 wt % to 35 wt % asphalt based on a total weight of the ASW powder with the remainder limestone, granules, and impurities. In some embodiments, the ASW powder comprises 5 wt % to 30 wt % asphalt based on a total weight of the ASW powder with the remainder limestone, granules, and impurities. In some embodiments, the ASW powder comprises 5 wt % to 20 wt % asphalt based on a total weight of the ASW powder with the remainder limestone, granules, and impurities. In some embodiments, the ASW powder comprises 5 wt % to 15 wt % asphalt based on a total weight of the ASW powder with the remainder limestone, granules, and impurities. In some embodiments, the ASW powder comprises 5 wt % to 10 wt % asphalt based on a total weight of the ASW powder with the remainder limestone, granules, and impurities.

In some embodiments, an exemplary method of the present disclosure does not comprise a wet extraction step.

In embodiments, the method further comprises an air stripping step before one or more of the screening steps detailed herein.

In some embodiments, one or more dust collection steps may be performed at any stage of the method (i.e., before, during, after, or between any step(s) of an exemplary method described herein) without departing from the scope of the present disclosure. In some embodiments, residual waste products from the ASW may be removed at any stage of the process (i.e., before, during, after, or between any step(s) of an exemplary method described herein) without departing from the scope of the present disclosure. A non-limiting example of a residual waste product is a residual plastic material from the asphalt shingles, such as, but not limited to, residual portions of fiberglass mat.

In some embodiments, at least one aeration device may be added at any stage of the process (i.e., before, during, after, or between any step(s) of an exemplary method described herein) without departing from the scope of the present disclosure. In some embodiments, the at least one aeration device includes, but is not limited to, at least one air separator described herein, at least one aspirator, or any combination thereof.

In some embodiments an exemplary method according to the present disclosure may be performed in any order.

In some non-limiting embodiments, an exemplary method of the present disclosure is performed in the following order: (a) obtaining the ASW; (b) grinding the ASW to form ground ASW; (c) screening the ground ASW with the rotary screener to form the first set of ASW particles and the second set of ASW particles; (d) removing at least some of the granules of the ASW from at least one of the first set of ASW particles, the second set of ASW particles, or a combination thereof with at least one granule liberator, such as at least one rotary impact separator; (e) grinding the first set of ASW particles to result in a third set of particles; (f) separating the combination of the second and third sets of ASW particles using an air separator to result in a fourth set of ASW particles and a fifth set of ASW particles; (g) grinding the fourth set of ASW particles to result in a sixth set of particles.

In some embodiments, an exemplary method of the present disclosure does not comprise a grinding step after step (g). In some embodiments, an exemplary method of the present disclosure does not comprise any grinding steps other than steps (b), (e), and (g). In some embodiments, an exemplary method of the present disclosure does not comprise a screening step after step (f).

Figure 3:
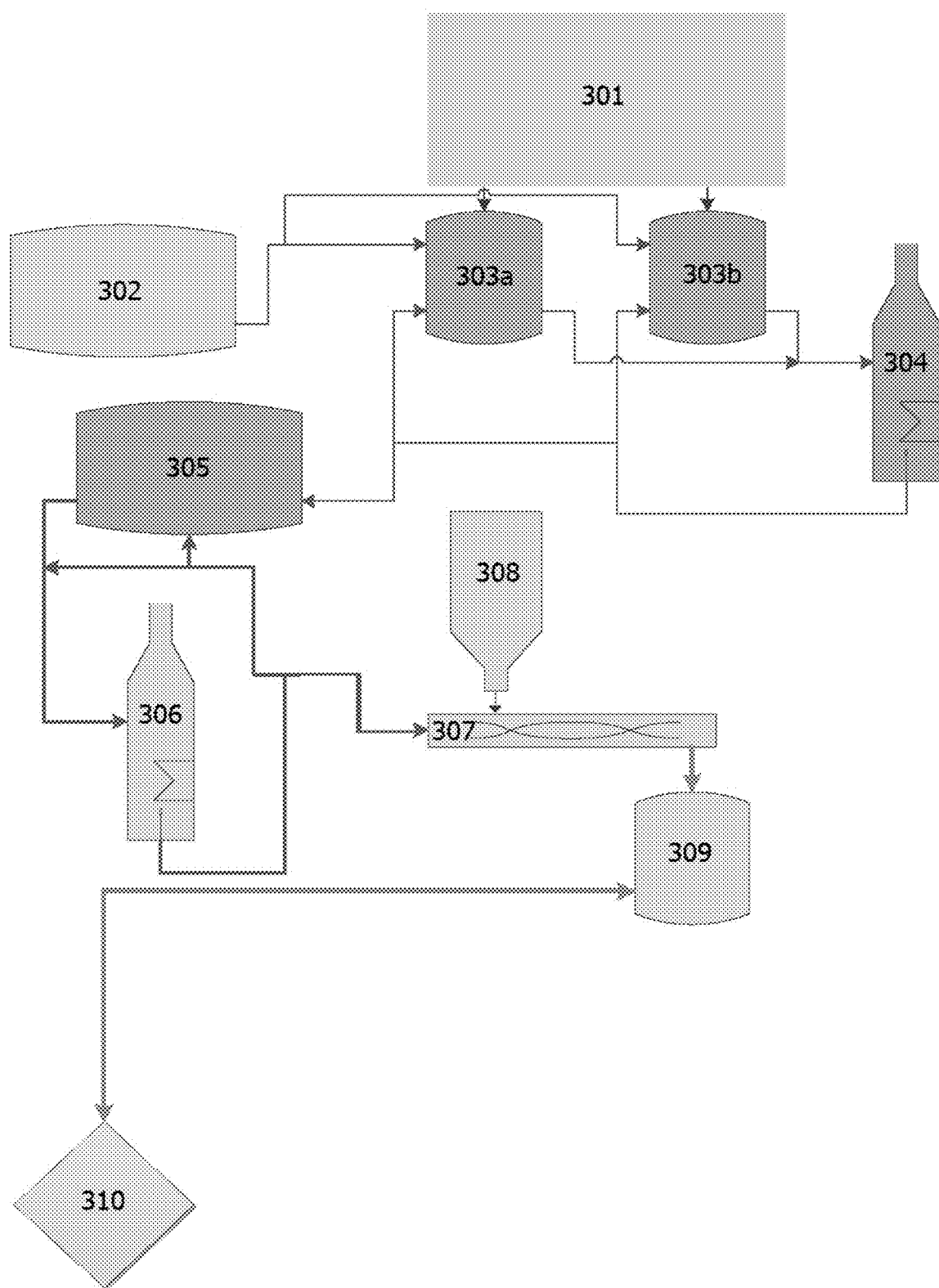
FIG. 3 is a flow diagram depicting an exemplary method of forming an ASW powder filled coating according to the present disclosure.

An exemplary embodiment of the present disclosure is shown in FIG. 1. As shown in the non-limiting exemplary embodiment of FIG. 1, asphalt shingle waste (ASW) 101 may be obtained. In some embodiments, the ASW 101 is subjected to a grinding step 102 to form ground ASW particles. In some embodiments, the ground ASW particles 103 are subjected to a screening step 104 to form a first set of ASW particles 105 and a second set of ASW particles 106. In some embodiments, the screening step 104 is performed with a rotary screener. In some embodiments, some or all of the granules are removed from the first set of ASW particles 105 using rotary impact separator 107. While not depicted in FIG. 1, rotary impact separator 107 may also remove some or all of the granules from the second set of ASW particles 106. In some embodiments, the first set of particles 105 is subjected to a grinding step 108, so as to form a third set of ASW particles 109. In some embodiments the second set of ASW particles 106 and the third set of ASW particles 109 may be combined to form a combination 110 of the second and third sets of ASW particles. In some embodiments, the combination 110 of the second and third sets of ASW particles 110 is fed into an air separator 111, where the combination 110 of the second and third sets of ASW particles are separated into a fourth set of ASW particles 112 and a fifth set of ASW particles 113. In some embodiments, the fourth set of ASW particles 112 is subjected to a grinding step 114, so as to form a sixth set of ASW particles 115. In some embodiments, the fifth set of ASW particles 113 and the sixth set of ASW particles 115 are combined to form ASW powder 116. In some embodiments, ASW powder 116 is combined with an asphalt coating to form a partially filled asphalt coating, as shown in FIG. 3 and described herein, infra. In some embodiments, limestone or other filler material may be added to the partially filled asphalt coating to form a filled asphalt coating, as shown in FIG. 3 and described herein, infra. In some embodiments, the filled asphalt coating (not shown) is incorporated into a roofing shingle (not shown).

Exemplary Briquetting Methods

In some embodiments, the ASW powder is formed into a plurality of briquettes. In some embodiments, each briquette of the plurality of briquettes comprises the ASW powder. In some embodiments, some of the plurality of briquettes comprises the ASW powder.

In some embodiments, each briquette of the plurality of briquettes comprises at least one of: the ASW powder, AC powder (as described herein), or any combination thereof. In some embodiments, some of the plurality of briquettes comprises the ASW powder, the AC powder, or any combination thereof. In some embodiments, the plurality of briquettes is formed after performing the grinding steps and screening steps (described herein) on the ASW to result in the ASW powder.

In some embodiments, limestone powder or other filler is added to at least one of: the ASW powder, the AC powder, or any combination thereof to form the plurality of briquettes. In some embodiments, the plurality of briquettes may be obtained (e.g., delivered, purchased, obtained from storage, formed, compressed, or any combination thereof).

In some embodiments, the plurality of briquettes is formed by compressing the ASW powder and the limestone powder and at a pressure sufficient to form the plurality of briquettes. In some embodiments, the plurality of briquettes is formed by compressing the ASW powder at a pressure sufficient to form the plurality of briquettes. Any suitable compression device may be used, including but not limited to, a piston, a briquetting machine, a plurality of compression wheels, or any combination thereof.

In some embodiments, the pressure sufficient to form the plurality of briquettes ranges from 200 psi to 20,000 psi. In some embodiments, the pressure sufficient to form the plurality of briquettes ranges from 500 psi to 20,000 psi. In some embodiments, the pressure sufficient to form the plurality of briquettes ranges from 1,000 psi to 20,000 psi. In some embodiments, the pressure sufficient to form the plurality of briquettes ranges from 5,000 psi to 20,000 psi. In some embodiments, the pressure sufficient to form the plurality of briquettes ranges from 10,000 psi to 20,000 psi. In some embodiments, the pressure sufficient to form the plurality of briquettes ranges from 15,000 psi to 20,000 psi.

In some embodiments, the pressure sufficient to form the plurality of briquettes ranges from 200 psi to 15,000 psi. In some embodiments, the pressure sufficient to form the plurality of briquettes ranges from 200 psi to 10,000 psi. In some embodiments, the pressure sufficient to form the plurality of briquettes ranges from 200 psi to 5,000 psi. In some embodiments, the pressure sufficient to form the plurality of briquettes ranges from 200 psi to 1,000 psi. In some embodiments, the pressure sufficient to form the plurality of briquettes ranges from 200 psi to 5000 psi.

In some embodiments, the pressure sufficient to form the plurality of briquettes ranges from 500 psi to 15,000 psi. In some embodiments, the pressure sufficient to form the plurality of briquettes ranges from 1,000 psi to 10,000 psi. In some embodiments, the pressure sufficient to form the plurality of briquettes is 500 psi.

The plurality of briquettes may be any shape. In some embodiments, each briquette the plurality of briquettes is spherical. In some embodiments, each briquette of the plurality of briquettes is an oblate spheroid (i.e., an ellipsoid). In some embodiments the plurality of briquettes may include brqiuettes having at least one of the following non-limiting shapes: a rectangular prism, a cube, a cone, a tetrahedron, a pentahedron, a hexahedron, a dodecahedron, a torus, or any combination thereof.

The plurality of briquettes may have any size. In some embodiments, each briquette of the plurality of briquettes may be spherical with a diameter in a range of 0.5 inches to 2 inches. In some embodiments, each briquette of the plurality of briquettes may be spherical with a diameter in a range of 1 inch to 2 inches. In some embodiments, each briquette of the plurality of briquettes may be spherical with a diameter in a range of 1.5 inches to 2 inches. In some embodiments, each briquette of the plurality of briquettes may be spherical with a diameter in a range of 0.5 inches to 1.5 inches. In some embodiments, each briquette of the plurality of briquettes may be spherical with a diameter in a range of 0.5 inches to 1 inch. In some embodiments, each briquette of the plurality of briquettes may be spherical with a diameter in a range of 1 inch to 1.5 inches.

In some embodiments, each briquette of the plurality of briquettes may be an oblate spheroid with at least one of: a first diameter, a second diameter, or any combination thereof having a range of 0.5 inches to 2 inches. In some embodiments, each briquette of the plurality of briquettes may be an oblate spheroid with at least one of: a first diameter, a second diameter, or any combination thereof having a range of 1 inch to 2 inches. In some embodiments, each briquette of the plurality of briquettes may be an oblate spheroid with at least one of: a first diameter, a second diameter, or any combination thereof having a range of 1.5 inches to 2 inches In some embodiments, each briquette of the plurality of briquettes may be an oblate spheroid with at least one of: a first diameter, a second diameter, or any combination thereof having a range of 0.5 inches to 1.5 inches In some embodiments, each briquette of the plurality of briquettes may be an oblate spheroid with at least one of: a first diameter, a second diameter, or any combination thereof having a range of 0.5 inches to 1 inch. In some embodiments, each briquette of the plurality of briquettes may be an oblate spheroid with at least one of: a first diameter, a second diameter, or any combination thereof having a range of 1 inch to 1.5 inches In some embodiments, during the feeding of at least one of: the AC powder, the ASW powder, or any combination thereof into the at least one first mixer (as described herein, infra), at least a portion of the AC powder or the ASW powder is in the form of a briquette. In some embodiments, during the feeding of into the at least one first mixer, all of the AC powder, all of the ASW powder, or all of both is in the form of a briquette.

Figure 2:
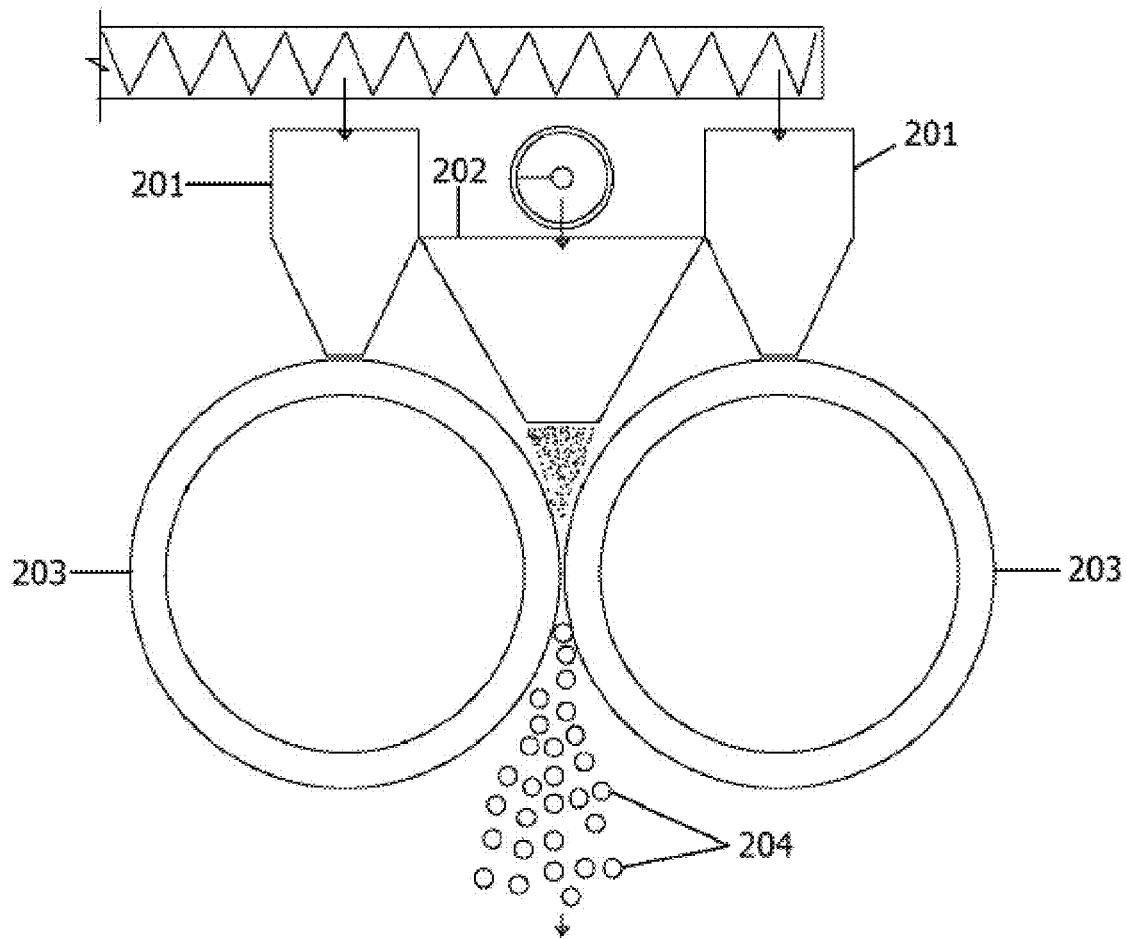
FIG. 2 is a non-limiting example of a briquetting process according to the present disclosure.

FIG. 2 is a non-limiting example of a briquetting method according to the present disclosure. As shown, in some embodiments, limestone powder, other filler, or combination thereof 201 coats compression wheels 203. The ASW powder, AC powder, or combination thereof 202 is fed between the coated compression wheels 203. The compression wheels 203 apply a sufficient pressure to: the limestone powder, other filler, or combination thereof 201; and the ASW powder, AC powder, or combination thereof 202, so as to form a plurality of briquettes 204.

Exemplary Methods of forming Asphalt Shingle Waste (ASW) Powder Filled Coatings

Some embodiments of the present disclosure relate to methods of forming asphalt shingle waste powder filled coatings from asphalt shingle waste. In some embodiments, any steps of forming asphalt shingle waste powder described herein, any steps of forming briquettes described herein, or any combination thereof, may be combined with any of the methods of forming asphalt shingle waste powder filled coatings described herein. In some embodiments, the method is a continuous process. In some embodiments, the method is a batch process. In some embodiments, the method is a semi-continuous process. In some embodiments, the method is a semi-batch process.

In some embodiments of the present disclosure, asphalt shingle waste (ASW) is obtained. In some embodiments, the ASW comprises asphalt, limestone powder, granules, and impurities. In some embodiments, the ASW consists essentially of asphalt, limestone powder, granules, and impurities. In some embodiments, the ASW consists of asphalt, limestone powder, granules, and impurities.

In some embodiments, the impurities comprise at least one of: fiberglass mat sand, fines, marker paint, sealant, one or more adhesives, tape, plastic debris, paper debris, soil, woods, nails, or any combination thereof.

In some embodiments, sufficient dry grinding and screening steps (including but not limited to any dry grinding and screening steps defined herein, supra) are performed on the ASW to result in ASW powder having an average particle size of 2 microns to 425 microns. In some embodiments, sufficient dry grinding and screening steps are performed on the ASW to result in ASW powder having an average particle size of 2 microns to 325 microns. In some embodiments, sufficient dry grinding and screening steps are performed on the ASW to result in ASW powder having an average particle size of 2 microns to 225 microns. In some embodiments, sufficient dry grinding and screening steps are performed on the ASW to result in ASW powder having an average particle size of 2 microns to 125 microns. In some embodiments, sufficient dry grinding and screening steps are performed on the ASW to result in ASW powder having an average particle size of 2 microns to 100 microns. In some embodiments, sufficient dry grinding and screening steps are performed on the ASW to result in ASW powder having an average particle size of 2 microns to 75 microns. In some embodiments, sufficient dry grinding and screening steps are performed on the ASW to result in ASW powder having an average particle size of 2 microns to 50 microns. In some embodiments, sufficient dry grinding and screening steps are performed on the ASW to result in ASW powder having an average particle size of 2 microns to 25 microns. In some embodiments, sufficient dry grinding and screening steps are performed on the ASW to result in ASW powder having an average particle size of 2 microns to 20 microns. In some embodiments, sufficient dry grinding and screening steps are performed on the ASW to result in ASW powder having an average particle size of 2 microns to 15 microns. In some embodiments, sufficient dry grinding and screening steps are performed on the ASW to result in ASW powder having an average particle size of 2 microns to 10 microns. In some embodiments, sufficient dry grinding and screening steps are performed on the ASW to result in ASW powder having an average particle size of 2 microns to 5 microns.

In some embodiments, sufficient dry grinding and screening steps are performed on the ASW to result in ASW powder having an average particle size of 5 microns to 425 microns. In some embodiments, sufficient dry grinding and screening steps are performed on the ASW to result in ASW powder having an average particle size of 10 microns to 425 microns. In some embodiments, sufficient dry grinding and screening steps are performed on the ASW to result in ASW powder having an average particle size of 15 microns to 425 microns. In some embodiments, sufficient dry grinding and screening steps are performed on the ASW to result in ASW powder having an average particle size of 20 microns to 425 microns. In some embodiments, sufficient dry grinding and screening steps are performed on the ASW to result in ASW powder having an average particle size of 25 microns to 425 microns. In some embodiments, sufficient dry grinding and screening steps are performed on the ASW to result in ASW powder having an average particle size of 50 microns to 425 microns. In some embodiments, sufficient dry grinding and screening steps are performed on the ASW to result in ASW powder having an average particle size of 75 microns to 425 microns. In some embodiments, sufficient dry grinding and screening steps are performed on the ASW to result in ASW powder having an average particle size of 100 microns to 425 microns. In some embodiments, sufficient dry grinding and screening steps are performed on the ASW to result in ASW powder having an average particle size of 125 microns to 425 microns. In some embodiments, sufficient dry grinding and screening steps are performed on the ASW to result in ASW powder having an average particle size of 225 microns to 425 microns. In some embodiments, sufficient dry grinding and screening steps are performed on the ASW to result in ASW powder having an average particle size of 325 microns to 425 microns.

In some embodiments, sufficient dry grinding and screening steps are performed on the ASW to result in ASW powder having an average particle size of 5 microns to 325 microns. In some embodiments, sufficient dry grinding and screening steps are performed on the ASW to result in ASW powder having an average particle size of 10 microns to 225 microns. In some embodiments, sufficient dry grinding and screening steps are performed on the ASW to result in ASW powder having an average particle size of 25 microns to 125 microns. In some embodiments, sufficient dry grinding and screening steps are performed on the ASW to result in ASW powder having an average particle size of 50 microns to 100 microns.

In some embodiments, sufficient dry grinding and screening steps are performed on the ASW to result in ASW powder having an average particle size of 10 microns to 250 microns. In some embodiments, sufficient dry grinding and screening steps are performed on the ASW to result in ASW powder having an average particle size of 10 microns to 200 microns. In some embodiments, sufficient dry grinding and screening steps are performed on the ASW to result in ASW powder having an average particle size of 10 microns to 150 microns. In some embodiments, sufficient dry grinding and screening steps are performed on the ASW to result in ASW powder having an average particle size of 10 microns to 100 microns. In some embodiments, sufficient dry grinding and screening steps are performed on the ASW to result in ASW powder having an average particle size of 10 microns to 75 microns. In some embodiments, sufficient dry grinding and screening steps are performed on the ASW to result in ASW powder having an average particle size of 10 microns to 50 microns. In some embodiments, sufficient dry grinding and screening steps are performed on the ASW to result in ASW powder having an average particle size of 10 microns to 25 microns. In some embodiments, sufficient dry grinding and screening steps are performed on the ASW to result in ASW powder having an average particle size of 10 microns to 20 microns. In some embodiments, sufficient dry grinding and screening steps are performed on the ASW to result in ASW powder having an average particle size of 10 microns to 15 microns.

In some embodiments, sufficient dry grinding and screening steps are performed on the ASW to result in ASW powder having an average particle size of 15 microns to 250 microns. In some embodiments, sufficient dry grinding and screening steps are performed on the ASW to result in ASW powder having an average particle size of 20 microns to 250 microns. In some embodiments, sufficient dry grinding and screening steps are performed on the ASW to result in ASW powder having an average particle size of 25 microns to 250 microns. In some embodiments, sufficient dry grinding and screening steps are performed on the ASW to result in ASW powder having an average particle size of 50 microns to 250 microns. In some embodiments, sufficient dry grinding and screening steps are performed on the ASW to result in ASW powder having an average particle size of 75 microns to 250 microns. In some embodiments, sufficient dry grinding and screening steps are performed on the ASW to result in ASW powder having an average particle size of 100 microns to 250 microns. In some embodiments, sufficient dry grinding and screening steps are performed on the ASW to result in ASW powder having an average particle size of 150 microns to 250 microns. In some embodiments, sufficient dry grinding and screening steps are performed on the ASW to result in ASW powder having an average particle size of 200 microns to 250 microns.

In some embodiments, sufficient dry grinding and screening steps are performed on the ASW to result in ASW powder having an average particle size of 20 microns to 200 microns. In some embodiments, sufficient dry grinding and screening steps are performed on the ASW to result in ASW powder having an average particle size of 40 microns to 100 microns. In some embodiments, sufficient dry grinding and screening steps are performed on the ASW to result in ASW powder having an average particle size of 80 microns to 90 microns.

In some embodiments, sufficient dry grinding and screening steps are performed on the ASW to result in ASW powder having 5 wt % to 40 wt % asphalt based on a total weight of the powder. In some embodiments, sufficient dry grinding and screening steps are performed on the ASW to result in ASW powder having 10 wt % to 40 wt % asphalt based on a total weight of the powder. In some embodiments, sufficient dry grinding and screening steps are performed on the ASW to result in ASW powder having 15 wt % to 40 wt % asphalt based on a total weight of the powder. In some embodiments, sufficient dry grinding and screening steps are performed on the ASW to result in ASW powder having 20 wt % to 40 wt % asphalt based on a total weight of the ASW powder. In some embodiments, sufficient dry grinding and screening steps are performed on the ASW to result in ASW powder having 25 wt % to 40 wt % asphalt based on a total weight of the ASW powder. In some embodiments, sufficient dry grinding and screening steps are performed on the ASW to result in ASW powder having 30 wt % to 40 wt % asphalt based on a total weight of the ASW powder. In some embodiments, sufficient dry grinding and screening steps are performed on the ASW to result in ASW powder having 35 wt % to 40 wt % asphalt based on a total weight of the ASW powder.

In some embodiments, sufficient dry grinding and screening steps are performed on the ASW to result in ASW powder having 5 wt % to 35 wt % asphalt based on a total weight of the ASW powder. In some embodiments, sufficient dry grinding and screening steps are performed on the ASW to result in ASW powder having 5 wt % to 30 wt % asphalt based on a total weight of the ASW powder. In some embodiments, sufficient dry grinding and screening steps are performed on the ASW to result in ASW powder having 5 wt % to 25 wt % asphalt based on a total weight of the ASW powder. In some embodiments, sufficient dry grinding and screening steps are performed on the ASW to result in ASW powder having 5 wt % to 20 wt % asphalt based on a total weight of the ASW powder. In some embodiments, sufficient dry grinding and screening steps are performed on the ASW to result in ASW powder having 5 wt % to 15 wt % asphalt based on a total weight of the ASW powder. In some embodiments, sufficient dry grinding and screening steps are performed on the ASW to result in ASW powder having 5 wt % to 10 wt % asphalt based on a total weight of the ASW powder.

In some embodiments, sufficient dry grinding and screening steps are performed on the ASW to result in ASW powder having 10 wt % to 35 wt % asphalt based on a total weight of the powder. In some embodiments, sufficient dry grinding and screening steps are performed on the ASW to result in ASW powder having 15 wt % to 30 wt % asphalt based on a total weight of the powder. In some embodiments, sufficient dry grinding and screening steps are performed on the ASW to result in ASW powder having 20 wt % to 25 wt % asphalt based on a total weight of the powder.

In some embodiments, sufficient dry grinding and screening steps are performed on the ASW to result in ASW powder having 60 wt % to 95 wt % limestone powder, granules, and impurities based on the total weight of the ASW powder. In some embodiments, sufficient dry grinding and screening steps are performed on the ASW to result in ASW powder having 65 wt % to 95 wt % limestone powder, granules, and impurities based on the total weight of the ASW powder. In some embodiments, sufficient dry grinding and screening steps are performed on the ASW to result in ASW powder having 70 wt % to 95 wt % limestone powder, granules, and impurities based on the total weight of the ASW powder. In some embodiments, sufficient dry grinding and screening steps are performed on the ASW to result in ASW powder having 75 wt % to 95 wt % limestone powder, granules, and impurities based on the total weight of the ASW powder. In some embodiments, sufficient dry grinding and screening steps are performed on the ASW to result in ASW powder having 80 wt % to 95 wt % limestone powder, granules, and impurities based on the total weight of the ASW powder. In some embodiments, sufficient dry grinding and screening steps are performed on the ASW to result in ASW powder having 85 wt % to 95 wt % limestone powder, granules, and impurities based on the total weight of the ASW powder. In some embodiments, sufficient dry grinding and screening steps are performed on the ASW to result in ASW powder having 90 wt % to 95 wt % limestone powder, granules, and impurities based on the total weight of the ASW powder.

In some embodiments, sufficient dry grinding and screening steps are performed on the ASW to result in ASW powder having 60 wt % to 90 wt % limestone powder, granules, and impurities based on the total weight of the ASW powder. In some embodiments, sufficient dry grinding and screening steps are performed on the ASW to result in ASW powder having 60 wt % to 85 wt % limestone powder, granules, and impurities based on the total weight of the ASW powder. In some embodiments, sufficient dry grinding and screening steps are performed on the ASW to result in ASW powder having 60 wt % to 80 wt % limestone powder, granules, and impurities based on the total weight of the ASW powder. In some embodiments, sufficient dry grinding and screening steps are performed on the ASW to result in ASW powder having 60 wt % to 75 wt % limestone powder, granules, and impurities based on the total weight of the ASW powder. In some embodiments, sufficient dry grinding and screening steps are performed on the ASW to result in ASW powder having 60 wt % to 70 wt % limestone powder, granules, and impurities based on the total weight of the ASW powder. In some embodiments, sufficient dry grinding and screening steps are performed on the ASW to result in ASW powder having 60 wt % to 65 wt % limestone powder, granules, and impurities based on the total weight of the ASW powder.

In some embodiments, sufficient dry grinding and screening steps are performed on the ASW to result in ASW powder having 65 wt % to 90 wt % limestone powder, granules, and impurities based on the total weight of the ASW powder. In some embodiments, sufficient dry grinding and screening steps are performed on the ASW to result in ASW powder having 70 wt % to 85 wt % limestone powder, granules, and impurities based on the total weight of the ASW powder. In some embodiments, sufficient dry grinding and screening steps are performed on the ASW to result in ASW powder having 75 wt % to 80 wt % limestone powder, granules, and impurities based on the total weight of the ASW powder.

In some embodiments, the grinding steps and screening steps do not comprise wet extraction steps.

In some embodiments, a sufficient amount of the ASW powder and a sufficient amount of an asphalt coating are added to at least one first mixer to form a mixture of the ASW powder and the asphalt coating that comprises 0.1 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 1 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 2 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 20 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 30 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 40 wt % to 50 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 0.1 wt % to 40 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 30 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 20 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 10 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 5 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 2 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 1 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 1 wt % to 40 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 2 wt % to 30 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 20 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 15 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 50 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 60 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 70 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 90 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 95 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 99 wt % to 99.9 wt % of the asphalt coating based on a total weight of the mixture.

In some embodiments, a sufficient amount of the ASW powder and a sufficient amount of an asphalt coating are added to at least one first mixer to form a mixture of the ASW powder and the asphalt coating that comprises 50 wt % to 99 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 95 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 90 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 80 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 70 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 60 wt % of the asphalt coating based on a total weight of the mixture.

In some embodiments, a sufficient amount of the ASW powder and a sufficient amount of an asphalt coating are added to at least one first mixer to form a mixture of the ASW powder and the asphalt coating that comprises 60 wt % to 99 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 70 wt % to 95 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 90 wt % of the asphalt coating based on a total weight of the mixture.

In some embodiments, the mixture of the ASW powder and the asphalt coating is not subjected to grinding or screening steps. In some embodiments, the mixture of the ASW powder and the asphalt coating is not subjected to grinding steps. In some embodiments, the mixture of the ASW powder and the asphalt coating is not subjected to screening steps.

In some embodiments, asphalt containing (AC) powder is obtained. In some embodiments, the AC powder comprises ASW powder. In some embodiments the AC powder does not comprise ASW powder. In some embodiments, the AC powder comprises a mixture of ASW powder and non-ASW powder. In some embodiments, the AC powder is formed into briquettes as described herein. In some embodiments, the AC powder is obtained as a pre-formed briquette.

In some embodiments, a sufficient amount of the AC powder and a sufficient amount of an asphalt coating are added to at least one first mixer to form a mixture of the AC powder and the asphalt coating that comprises 0.1 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 1 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 2 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 5 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 10 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 20 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 30 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 40 wt % to 50 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 0.1 wt % to 40 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 30 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 20 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 10 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 5 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 2 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 1 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 1 wt % to 40 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 2 wt % to 30 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 5 wt % to 20 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 10 wt % to 15 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 50 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 60 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 70 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 80 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 90 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 95 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 99 wt % to 99.9 wt % of the asphalt coating based on a total weight of the mixture.

In some embodiments, a sufficient amount of the AC powder and a sufficient amount of an asphalt coating are added to at least one first mixer to form a mixture of the AC powder and the asphalt coating that comprises 50 wt % to 99 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 95 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 90 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 80 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 70 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 60 wt % of the asphalt coating based on a total weight of the mixture.

In some embodiments, a sufficient amount of the AC powder and a sufficient amount of an asphalt coating are added to at least one first mixer to form a mixture of the AC powder and the asphalt coating that comprises 60 wt % to 99 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 70 wt % to 95 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 80 wt % to 90 wt % of the asphalt coating based on a total weight of the mixture.

Non-limiting examples of mixers that can be used as the at least first one mixer include, but are not limited to, vertically or horizontally agitated tanks, high or low shear tubular mixers, horizontal paddle mixers, screw transport mixers, continuous high shear mixers, progressive cavity mixing pumps or any combination thereof.

In some embodiments, the at least one first mixer comprises a plurality of first mixers. In some embodiments, the at least one first mixer comprises at least two first mixers. In some embodiments, the at least one first mixer comprises at least three first mixers. In some embodiments, the at least one first mixer comprises at least four first mixers. In some embodiments, the at least one first mixer comprises at least five first mixers. In some embodiments, the at least one first mixer comprises at least ten first mixers. In some embodiments, the at least one first mixer comprises at least twenty first mixers. In some embodiments, the at least one first mixer comprises at least fifty first mixers. In some embodiments, the at least one first mixer comprises at least one-hundred first mixers.

In some embodiments, the at least one first mixer consists of a single mixer. In some embodiments, the at least one first mixer consists of two first mixers. In some embodiments, the at least one first mixer consists of three first mixers. In some embodiments, the at least one first mixer consists of four first mixers. In some embodiments, the at least one first mixer consists of five first mixers. In some embodiments, the at least one first mixer consists of ten first mixers. In some embodiments, the at least one first mixer consists of twenty first mixers. In some embodiments, the at least one first mixer consists of fifty first mixers. In some embodiments, the at least one first mixer consists of one-hundred first mixers.

In some embodiments, the asphalt coating comprises at least one of: oxidized asphalt coating, polymer modified asphalt coating, or mixtures thereof.

In some embodiments, the oxidized asphalt coating is obtained using an asphalt oxidation process. Non-limiting examples of suitable asphalt oxidation processes are described herein, infra. In some embodiments, the oxidized asphalt coating is fed directly from an oxidation process into the at least one first mixer. In some embodiments, the oxidized asphalt coating is oxidized "off-site" and fed from a storage tank into the at least one first mixer.

In some embodiments, the oxidized asphalt coating has a softening point of 190° F. to 250° F. In some embodiments, the oxidized asphalt coating has a softening point of 200° F. to 250° F. In some embodiments, the oxidized asphalt coating has a softening point of 210° F. to 250° F. In some embodiments, the oxidized asphalt coating has a softening point of 220° F. to 250° F. In some embodiments, the oxidized asphalt coating has a softening point of 230° F. to 250° F. In some embodiments, the oxidized asphalt coating has a softening point of 240° F. to 250° F.

In some embodiments, the oxidized asphalt coating has a softening point of 190° F. to 240° F. In some embodiments, the oxidized asphalt coating has a softening point of 190° F. to 230° F. In some embodiments, the oxidized asphalt coating has a softening point of 190° F. to 220° F. In some embodiments, the oxidized asphalt coating has a softening point of 190° F. to 210° F. In some embodiments, the oxidized asphalt coating has a softening point of 190° F. to 200° F.

In some embodiments, the oxidized asphalt coating has a softening point of 200° F. to 240° F. In some embodiments, the oxidized asphalt coating has a softening point of 210° F. to 230° F.

In some embodiments, the oxidized asphalt coating has a penetration point of 15 mm to 45 mm. In some embodiments, the oxidized asphalt coating has a penetration point of 20 mm to 45 mm. In some embodiments, the oxidized asphalt coating has a penetration point of 25 mm to 45 mm. In some embodiments, the oxidized asphalt coating has a penetration point of 30 mm to 45 mm. In some embodiments, the oxidized asphalt coating has a penetration point of 35 mm to 45 mm. In some embodiments, the oxidized asphalt coating has a penetration point of 40 mm to 45 mm.

In some embodiments, the oxidized asphalt coating has a penetration point of 15 mm to 40 mm. In some embodiments, the oxidized asphalt coating has a penetration point of 15 mm to 35 mm. In some embodiments, the oxidized asphalt coating has a penetration point of 15 mm to 30 mm. In some embodiments, the oxidized asphalt coating has a penetration point of 15 mm to 25 mm. In some embodiments, the oxidized asphalt coating has a penetration point of 15 mm to 20 mm.

In some embodiments, the oxidized asphalt coating has a penetration point of 20 mm to 40 mm. In some embodiments, the oxidized asphalt coating has a penetration point of 25 mm to 35 mm.

In some embodiments, the oxidized asphalt coating has a viscosity of 200 cP to 1,000 cP. In some embodiments, the oxidized asphalt coating has a viscosity of 300 cP to 1,000 cP. In some embodiments, the oxidized asphalt coating has a viscosity of 400 cP to 1,000 cP. In some embodiments, the oxidized asphalt coating has a viscosity of 500 cP to 1,000 cP. In some embodiments, the oxidized asphalt coating has a viscosity of 600 cP to 1,000 cP. In some embodiments, the oxidized asphalt coating has a viscosity of 700 cP to 1,000 cP. In some embodiments, the oxidized asphalt coating has a viscosity of 800 cP to 1,000 cP. In some embodiments, the oxidized asphalt coating has a viscosity of 900 cP to 1,000 cP.

In some embodiments, the oxidized asphalt coating has a viscosity of 200 cP to 1,000 cP. In some embodiments, the oxidized asphalt coating has a viscosity of 200 cP to 900 cP. In some embodiments, the oxidized asphalt coating has a viscosity of 200 cP to 800 cP. In some embodiments, the oxidized asphalt coating has a viscosity of 200 cP to 700 cP. In some embodiments, the oxidized asphalt coating has a viscosity of 200 cP to 600 cP. In some embodiments, the oxidized asphalt coating has a viscosity of 200 cP to 500 cP. In some embodiments, the oxidized asphalt coating has a viscosity of 200 cP to 400 cP. In some embodiments, the oxidized asphalt coating has a viscosity of 200 cP to 300 cP.

In some embodiments, the oxidized asphalt coating has a viscosity of 300 cP to 900 cP. In some embodiments, the oxidized asphalt coating has a viscosity of 400 cP to 800 cP. In some embodiments, the oxidized asphalt coating has a viscosity of 500 cP to 700 cP.

In some embodiments, the polymer modified asphalt coating is a poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

In some embodiments, the polymer modified asphalt coating comprises 3 wt % to 12 wt % of at least one polymer by weight of the polymer modified asphalt coating. In some embodiments, the polymer modified asphalt coating comprises 4 wt % to 12 wt % of at least one polymer by weight of the polymer modified asphalt coating. In some embodiments, the polymer modified asphalt coating comprises 5 wt % to 12 wt % of at least one polymer by weight of the polymer modified asphalt coating. In some embodiments, the polymer modified asphalt coating comprises 6 wt % to 12 wt % of at least one polymer by weight of the polymer modified asphalt coating. In some embodiments, the polymer modified asphalt coating comprises 7 wt % to 12 wt % of at least one polymer by weight of the polymer modified asphalt coating. In some embodiments, the polymer modified asphalt coating comprises 8 wt % to 12 wt % of at least one polymer by weight of the polymer modified asphalt coating. In some embodiments, the polymer modified asphalt coating comprises 9 wt % to 12 wt % of at least one polymer by weight of the polymer modified asphalt coating. In some embodiments, the polymer modified asphalt coating comprises 10 wt % to 12 wt % of at least one polymer by weight of the polymer modified asphalt coating. In some embodiments, the polymer modified asphalt coating comprises 11 wt % to 12 wt % of at least one polymer by weight of the polymer modified asphalt coating.

In some embodiments, the polymer modified asphalt coating comprises 3 wt % to 11 wt % of at least one polymer by weight of the polymer modified asphalt coating. In some embodiments, the polymer modified asphalt coating comprises 3 wt % to 10 wt % of at least one polymer by weight of the polymer modified asphalt coating. In some embodiments, the polymer modified asphalt coating comprises 3 wt % to 9 wt % of at least one polymer by weight of the polymer modified asphalt coating. In some embodiments, the polymer modified asphalt coating comprises 3 wt % to 8 wt % of at least one polymer by weight of the polymer modified asphalt coating. In some embodiments, the polymer modified asphalt coating comprises 3 wt % to 7 wt % of at least one polymer by weight of the polymer modified asphalt coating. In some embodiments, the polymer modified asphalt coating comprises 3 wt % to 6 wt % of at least one polymer by weight of the polymer modified asphalt coating. In some embodiments, the polymer modified asphalt coating comprises 3 wt % to 5 wt % of at least one polymer by weight of the polymer modified asphalt coating. In some embodiments, the polymer modified asphalt coating comprises 3 wt % to 4 wt % of at least one polymer by weight of the polymer modified asphalt coating.

In some embodiments, the polymer modified asphalt coating comprises 4 wt % to 11 wt % of at least one polymer by weight of the polymer modified asphalt coating. In some embodiments, the polymer modified asphalt coating comprises 5 wt % to 10 wt % of at least one polymer by weight of the polymer modified asphalt coating. In some embodiments, the polymer modified asphalt coating comprises 6 wt % to 9 wt % of at least one polymer by weight of the polymer modified asphalt coating. In some embodiments, the polymer modified asphalt coating comprises 7 wt % to 8 wt % of at least one polymer by weight of the polymer modified asphalt coating.

In some embodiments, the polymer modified asphalt coating has a softening point of 190° F. to 250° F. In some embodiments, the polymer modified asphalt coating has a softening point of 200° F. to 250° F. In some embodiments, the polymer modified asphalt coating has a softening point of 210° F. to 250° F. In some embodiments, the polymer modified asphalt coating has a softening point of 220° F. to 250° F. In some embodiments, the polymer modified asphalt coating has a softening point of 230° F. to 250° F. In some embodiments, the polymer modified asphalt coating has a softening point of 240° F. to 250° F.

In some embodiments, the polymer modified asphalt coating has a softening point of 190° F. to 240° F. In some embodiments, the polymer modified asphalt coating has a softening point of 190° F. to 230° F. In some embodiments, the polymer modified asphalt coating has a softening point of 190° F. to 220° F. In some embodiments, the polymer modified asphalt coating has a softening point of 190° F. to 210° F. In some embodiments, the polymer modified asphalt coating has a softening point of 190° F. to 200° F.

In some embodiments, the polymer modified asphalt coating has a softening point of 200° F. to 240° F. In some embodiments, the polymer modified asphalt coating has a softening point of 210° F. to 230° F.

In some embodiments, the polymer modified asphalt coating has a penetration point of 15 mm to 45 mm. In some embodiments, the polymer modified asphalt coating has a penetration point of 20 mm to 45 mm. In some embodiments, the polymer modified asphalt coating has a penetration point of 25 mm to 45 mm. In some embodiments, the polymer modified asphalt coating has a penetration point of 30 mm to 45 mm. In some embodiments, the polymer modified asphalt coating has a penetration point of 35 mm to 45 mm. In some embodiments, the polymer modified asphalt coating has a penetration point of 40 mm to 45 mm.

In some embodiments, the polymer modified asphalt coating has a penetration point of 15 mm to 40 mm. In some embodiments, the polymer modified asphalt coating has a penetration point of 15 mm to 35 mm. In some embodiments, the polymer modified asphalt coating has a penetration point of 15 mm to 30 mm. In some embodiments, the polymer modified asphalt coating has a penetration point of 15 mm to 25 mm. In some embodiments, the polymer modified asphalt coating has a penetration point of 15 mm to 20 mm.

In some embodiments, the polymer modified asphalt coating has a penetration point of 20 mm to 40 mm. In some embodiments, the polymer modified asphalt coating has a penetration point of 25 mm to 35 mm.

In some embodiments, the polymer modified asphalt coating has a viscosity of 200 cP to 1,000 cP. In some embodiments, the polymer modified asphalt coating has a viscosity of 300 cP to 1,000 cP. In some embodiments, the polymer modified asphalt coating has a viscosity of 400 cP to 1,000 cP. In some embodiments, the polymer modified asphalt coating has a viscosity of 500 cP to 1,000 cP. In some embodiments, the polymer modified asphalt coating has a viscosity of 600 cP to 1,000 cP. In some embodiments, the polymer modified asphalt coating has a viscosity of 700 cP to 1,000 cP. In some embodiments, the polymer modified asphalt coating has a viscosity of 800 cP to 1,000 cP. In some embodiments, the polymer modified asphalt coating has a viscosity of 900 cP to 1,000 cP.

In some embodiments, the polymer modified asphalt coating has a viscosity of 200 cP to 1,000 cP. In some embodiments, the polymer modified asphalt coating has a viscosity of 200 cP to 900 cP. In some embodiments, the polymer modified asphalt coating has a viscosity of 200 cP to 800 cP. In some embodiments, the polymer modified asphalt coating has a viscosity of 200 cP to 700 cP. In some embodiments, the polymer modified asphalt coating has a viscosity of 200 cP to 600 cP. In some embodiments, the polymer modified asphalt coating has a viscosity of 200 cP to 500 cP. In some embodiments, the polymer modified asphalt coating has a viscosity of 200 cP to 400 cP. In some embodiments, the polymer modified asphalt coating has a viscosity of 200 cP to 300 cP.

In some embodiments, the polymer modified asphalt coating has a viscosity of 300 cP to 900 cP. In some embodiments, the polymer modified asphalt coating has a viscosity of 400 cP to 800 cP. In some embodiments, the polymer modified asphalt coating has a viscosity of 500 cP to 700 cP.

In some embodiments, the mixture of: the ASW powder, the AC powder, or any combination thereof; and the asphalt coating is heated to form a heated mixture. Non-limiting examples of heaters that can be used to form the heated mixture include heat exchangers, horizontal or vertical direct fired heaters, horizontal or vertical indirect-fired (convection) heaters, fire-tube heaters, fluid tube heaters or any combination thereof. Non-limiting examples of heat exchangers include shell and tube heat exchangers with asphalt on either the shell or tube side, plate heat exchangers, heat recovery heat exchangers or any combination thereof.

In some embodiments, the mixture of: the ASW powder, the AC powder, or any combination thereof; and the asphalt coating is heated using at least one heater to form the heated mixture. In some embodiments, the mixture of: the ASW powder, the AC powder, or any combination thereof; and the asphalt coating is heated using a plurality of heaters to form the heated mixture. In some embodiments, the mixture of: the ASW powder, the AC powder, or any combination thereof; and the asphalt coating is heated using at least two heaters to form the heated mixture. In some embodiments, the mixture of: the ASW powder, the AC powder, or any combination thereof; and the asphalt coating is heated using at least three heaters to form the heated mixture. In some embodiments, the mixture of: the ASW powder, the AC powder, or any combination thereof; and the asphalt coating is heated using at least four heaters to form the heated mixture. In some embodiments, the mixture of: the ASW powder, the AC powder, or any combination thereof; and the asphalt coating is heated using at least five heaters to form the heated mixture. In some embodiments, the mixture of: the ASW powder, the AC powder, or any combination thereof; and the asphalt coating is heated using at least ten heaters to form the heated mixture. In some embodiments, the mixture of: the ASW powder, the AC powder, or any combination thereof; and the asphalt coating is heated using at least twenty heaters to form the heated mixture. In some embodiments, the mixture of: the ASW powder, the AC powder, or any combination thereof; and the asphalt coating is heated in at least fifty heaters to form the heated mixture. In some embodiments, the mixture of: the ASW powder, the AC powder, or any combination thereof; and the asphalt coating is heated using at least one-hundred heaters to form the heated mixture. In some embodiments, the mixture of: the ASW powder, the AC powder, or any combination thereof; and the asphalt coating is heated using one heater to form the heated mixture. In some embodiments, the mixture of: the ASW powder, the AC powder, or any combination thereof; and the asphalt coating is heated using two heaters to form the heated mixture. In some embodiments, the mixture of: the ASW powder, the AC powder, or any combination thereof; and the asphalt coating is heated using three heaters to form the heated mixture. In some embodiments, the mixture of: the ASW powder, the AC powder, or any combination thereof; and the asphalt coating is heated using four heaters to form the heated mixture. In some embodiments, the mixture of: the ASW powder, the AC powder, or any combination thereof; and the asphalt coating is heated using five heaters to form the heated mixture. In some embodiments, the mixture of: the ASW powder, the AC powder, or any combination thereof; and the asphalt coating is heated using ten heaters to form the heated mixture. In some embodiments, the mixture of: the ASW powder, the AC powder, or any combination thereof; and the asphalt coating is heated using twenty heaters to form the heated mixture. In some embodiments, the mixture of: the ASW powder, the AC powder, or any combination thereof; and the asphalt coating is heated using fifty heaters to form the heated mixture. In some embodiments, the mixture of: the ASW powder, the AC powder, or any combination thereof; and the asphalt coating is heated using one-hundred heaters to form the heated mixture.

In some embodiments, the heated mixture has a temperature in a range of 400° F. to 500° F. In some embodiments, the heated mixture has a temperature in a range of 410° F. to 500° F. In some embodiments, the heated mixture has a temperature in a range of 410° F. to 500° F. In some embodiments, the heated mixture has a temperature in a range of 420° F. to 500° F. In some embodiments, the heated mixture has a temperature in a range of 430° F. to 500° F. In some embodiments, the heated mixture has a temperature in a range of 440° F. to 500° F. In some embodiments, the heated mixture has a temperature in a range of 450° F. to 500° F. In some embodiments, the heated mixture has a temperature in a range of 460° F. to 500° F. In some embodiments, the heated mixture has a temperature in a range of 470° F. to 500° F. In some embodiments, the heated mixture has a temperature in a range of 480° F. to 500° F. In some embodiments, the heated mixture has a temperature in a range of 490° F. to 500° F.

In some embodiments, the heated mixture has a temperature in a range of 400° F. to 490° F. In some embodiments, the heated mixture has a temperature in a range of 400° F. to 480° F. In some embodiments, the heated mixture has a temperature in a range of 400° F. to 470° F. In some embodiments, the heated mixture has a temperature in a range of 400° F. to 460° F. In some embodiments, the heated mixture has a temperature in a range of 400° F. to 450° F. In some embodiments, the heated mixture has a temperature in a range of 400° F. to 440° F. In some embodiments, the heated mixture has a temperature in a range of 400° F. to 430° F. In some embodiments, the heated mixture has a temperature in a range of 400° F. to 420° F. In some embodiments, the heated mixture has a temperature in a range of 400° F. to 410° F.

In some embodiments, the heated mixture has a temperature in a range of 410° F. to 490° F. In some embodiments, the heated mixture has a temperature in a range of 420° F. to 480° F. In some embodiments, the heated mixture has a temperature in a range of 430° F. to 470° F. In some embodiments, the heated mixture has a temperature in a range of 440° F. to 460° F.

In some embodiments, the mixture of: the ASW powder, the AC powder, or any combination thereof; and the asphalt coating is homogenized, using at least one homogenizer, before heating, after heating, or any combination thereof. In some embodiments, the mixture of: the ASW powder, the AC powder, or any combination thereof; and the asphalt coating is homogenized, using a plurality of homogenizers, before heating, after heating, or any combination thereof.

In some embodiments, the mixture of: the ASW powder, the AC powder, or any combination thereof; and the asphalt coating is homogenized, using at least two homogenizers, before heating, after heating, or any combination thereof. In some embodiments, the mixture of: the ASW powder, the AC powder, or any combination thereof; and the asphalt coating is homogenized, using at least three homogenizers, before heating, after heating, or any combination thereof. In some embodiments, the mixture of: the ASW powder, the AC powder, or any combination thereof; and the asphalt coating is homogenized, using at least four homogenizers, before heating, after heating, or any combination thereof. In some embodiments, the mixture of the mixture of: the ASW powder, the AC powder, or any combination thereof; and the asphalt coating is homogenized, using at least five homogenizers, before heating, after heating, or any combination thereof. In some embodiments, the mixture of: the ASW powder, the AC powder, or any combination thereof; and the asphalt coating is homogenized, using at least ten homogenizers, before heating, after heating, or any combination thereof. In some embodiments, the mixture of: the ASW powder, the AC powder, or any combination thereof; and the asphalt coating is homogenized, using at least twenty homogenizers, before heating, after heating, or any combination thereof. In some embodiments, the mixture of: the ASW powder, the AC powder, or any combination thereof; and the asphalt coating is homogenized, using at least fifty homogenizers, before heating, after heating, or any combination thereof. In some embodiments, the mixture of: the ASW powder, the AC powder, or any combination thereof; and the asphalt coating is homogenized, using at least one-hundred homogenizers, before heating, after heating, or any combination thereof.

In some embodiments, the mixture of: the ASW powder, the AC powder, or any combination thereof; and the asphalt coating is homogenized, using one homogenizer, before heating, after heating, or any combination thereof. In some embodiments the mixture of: the ASW powder, the AC powder, or any combination thereof; and the asphalt coating is homogenized, using two homogenizers, before heating, after heating, or any combination thereof. In some embodiments, the mixture of: the ASW powder, the AC powder, or any combination thereof; and the asphalt coating is homogenized, using three homogenizers, before heating, after heating, or any combination thereof. In some embodiments, the mixture of: the ASW powder, the AC powder, or any combination thereof; and the asphalt coating is homogenized, using four homogenizers, before heating, after heating, or any combination thereof. In some embodiments, the mixture of: the ASW powder, the AC powder, or any combination thereof; and the asphalt coating is homogenized, using five homogenizers, before heating, after heating, or any combination thereof. In some embodiments, the mixture of: the ASW powder, the AC powder, or any combination thereof; and the asphalt coating is homogenized, using ten homogenizers, before heating, after heating, or any combination thereof. In some embodiments, the mixture of: the ASW powder, the AC powder, or any combination thereof; and the asphalt coating is homogenized, using twenty homogenizers, before heating, after heating, or any combination thereof. In some embodiments, the mixture of: the ASW powder, the AC powder, or any combination thereof; and the asphalt coating is homogenized, using fifty homogenizers, before heating, after heating, or any combination thereof. In some embodiments, the mixture of: the ASW powder, the AC powder, or any combination thereof; and the asphalt coating is homogenized, using one-hundred homogenizers, before heating, after heating, or any combination thereof.

In some embodiments, any number of heaters may be located upstream from any number of homogenizers, downstream from any number of homogenizers, or any combination thereof.

In some embodiments, the heated mixture of: the ASW powder, the AC powder, or any combination thereof; and the asphalt coating is conveyed to at least one second mixer. In some embodiments, the at least one second mixer is of the same type as the at least one first mixer. In some embodiments, the at least one second mixer is of a different type than the at least one first mixer Non-limiting examples of mixers that can be used as the at least one second mixer include, vertically or horizontally agitated tanks, high or low shear tubular mixers, horizontal paddle mixers, screw transport mixers, continuous high shear mixers, progressive cavity mixing pumps or any combination thereof.

In some embodiments, the at least one second mixer comprises a plurality of second mixers. In some embodiments, the at least one second mixer comprises at least two second mixers. In some embodiments, the at least one second mixer comprises at least three second mixers. In some embodiments, the at least one second mixer comprises at least four second mixers. In some embodiments, the at least one second mixer comprises at least five second mixers. In some embodiments, the at least one second mixer comprises at least ten second mixers. In some embodiments, the at least one second mixer comprises at least twenty second mixers. In some embodiments, the at least one second mixer comprises at least fifty second mixers. In some embodiments, the at least one second mixer comprises at least one-hundred second mixers.

In some embodiments, the at least one second mixer consists of a single second mixer. In some embodiments, the at least one second mixer consists of two second mixers. In some embodiments, the at least one second mixer consists of three second mixers. In some embodiments, the at least one second mixer consists of four second mixers. In some embodiments, the at least one second mixer consists of five second mixers. In some embodiments, the at least one second mixer consists of ten second mixers. In some embodiments, the at least one second mixer consists of twenty second mixers. In some embodiments, the at least one second mixer consists of fifty second mixers. In some embodiments, the at least one second mixer consists of one-hundred second mixers.

In some embodiments, a sufficient amount of at least one filler material is mixed with the heated mixture in the at least one second mixer to obtain an ASW powder filled coating, an AC powder filled coating, or combination thereof that comprises 30 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain a ASW powder filled coating, an AC powder filled coating, or combination thereof that comprises 35 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 40 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 45 wt % to 50 wt % asphalt based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 30 wt % to 45 wt % asphalt based on the total weight of the ASW powder filled coating, the AC powder filled coating, or combination thereof. In some embodiments, a sufficient amount of at least one filler material is mixed with the heated mixture in the at least one second mixer to an ASW powder filled coating, an AC powder filled coating, or combination thereof that comprises 30 wt % to 40 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 30 wt % to 35 wt % asphalt based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 35 wt % to 45 wt % asphalt based on the total weight of the ASW or AC powder filled coating.

In some embodiments, a sufficient amount of at least one filler material is mixed with the heated mixture in the at least one second mixer to obtain an ASW powder filled coating, an AC powder filled coating, or combination thereof that comprises 50 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 65 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 60 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 55 wt % of: limestone powder, granules, impurities, and the at least one filler material based on the total weight of the ASW powder filled coating or AC powder filled coating.

In some embodiments, a sufficient amount of at least one filler material is mixed with the heated mixture in the at least one second mixer to obtain an ASW powder filled coating, an AC powder filled coating, or combination thereof that comprises 55 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 60 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 65 wt % to 70 wt % of: limestone powder, granules, impurities, and the at least one filler material based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 55 wt % to 60 wt % of: limestone powder, granules, impurities, and the at least one filler material based on the total weight of the ASW powder filled coating or AC powder filled coating.

In some embodiments, the at least one filler material is subjected to a dust-collection step. In some embodiments, the at least one filler material is heated before the at least one filler material is added the at least one second mixer.

A non-limiting example of the at least one filler material is limestone powder. Other non-limiting examples of the at least one filler material include flyash, fiberglass particles, stone dust, and combinations thereof.

In some embodiments, the weight percentage of asphalt in the ASW powder filled coating, based on the total weight of the ASW powder filled coating, is the same as a weight percentage of asphalt in a powder filled coating that does not contain any ASW. In some embodiments, a softening point of the ASW powder filled coating is the same as a softening point of a powder filled coating that does not contain any ASW. In some embodiments, a penetration point of the ASW powder filled coating is the same as a penetration point of a powder filled coating that does not contain any ASW.

In some embodiments, the ASW powder filled coating comprises 1 wt % to 40 wt % of the ASW powder based on the total weight of the ASW powder filled coating. In some embodiments, the ASW powder filled coating comprises 5 wt % to 40 wt % of the ASW powder based on the total weight of the ASW powder filled coating. In some embodiments, the ASW powder filled coating comprises 10 wt % to 40 wt % of the ASW powder based on the total weight of the ASW powder filled coating. In some embodiments, the ASW powder filled coating comprises 20 wt % to 40 wt % of the ASW powder based on the total weight of the ASW powder filled coating. In some embodiments, the ASW powder filled coating comprises 30 wt % to 40 wt % of the ASW powder based on the total weight of the ASW powder filled coating.

In some embodiments, the ASW powder filled coating comprises 1 wt % to 30 wt % of the ASW powder based on the total weight of the ASW powder filled coating. In some embodiments, the ASW powder filled coating comprises 1 wt % to 20 wt % of the ASW powder based on the total weight of the ASW powder filled coating. In some embodiments, the ASW powder filled coating comprises 1 wt % to 10 wt % of the ASW powder based on the total weight of the ASW powder filled coating. In some embodiments, the ASW powder filled coating comprises 1 wt % to 5 wt % of the ASW powder based on the total weight of the ASW powder filled coating.

In some embodiments, the ASW powder filled coating comprises 5 wt % to 40 wt % of the ASW powder based on the total weight of the ASW powder filled coating. In some embodiments, the ASW powder filled coating comprises 10 wt % to 30 wt % of the ASW powder based on the total weight of the ASW powder filled coating. In some embodiments, the ASW powder filled coating comprises 15 wt % to 20 wt % of the ASW powder based on the total weight of the ASW powder filled coating. In some embodiments, the ASW powder filled coating comprises 20 wt % to 25 wt % of the ASW powder based on the total weight of the ASW powder filled coating.

In some embodiments where the at least one filler material comprises limestone powder, the ASW powder filled coating, the AC powder filled coating, or combination thereof can comprise 50% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 55% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 60% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 65% to 70% of: limestone powder, granules, and impurities based on the total weight of the ASW powder filled coating, the AC powder filled coating, or combination thereof.

In some embodiments where the at least one filler material comprises limestone powder, the ASW powder filled coating, the AC powder filled coating, or combination thereof can comprise 55% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 60% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 65% to 70% of: limestone powder, granules, and impurities based on the total weight of the ASW powder filled coating, the AC powder filled coating, or combination thereof.

In some embodiments where the at least one filler material comprises limestone powder, the ASW powder filled coating, the AC powder filled coating, or combination thereof can comprise 55% to 60% of: limestone powder, granules, and impurities based on the total weight of the ASW powder filled coating, the AC powder filled coating, or combination thereof.

In some embodiments, the ASW powder filled coating, the AC powder filled coating, or combination thereof may be homogenized. In some embodiments, any number of homogenizers, heaters, or mixers may be added at any stage of the method without deviating from the scope of the present disclosure.

In some embodiments, the ASW powder filled coating, the AC powder filled coating, or combination thereof has a viscosity of 100 cP to 20,000 cP. In some embodiments, the ASW powder filled coating, the AC powder filled coating, or combination thereof has a viscosity of 500 cP to 20,000 cP. In some embodiments, the ASW powder filled coating, the AC powder filled coating, or combination thereof has a viscosity of 1,000 cP to 20,000 cP. In some embodiments, the ASW powder filled coating, the AC powder filled coating, or combination thereof has a viscosity of 5,000 cP to 20,000 cP. In some embodiments, the ASW powder filled coating, the AC powder filled coating, or combination thereof has a viscosity of 10,000 cP to 20,000 cP. In some embodiments, the ASW powder filled coating, the AC powder filled coating, or combination thereof has a viscosity of 15,000 cP to 20,000 cP.

In some embodiments, the ASW powder filled coating, the AC powder filled coating, or combination thereof has a viscosity of 100 cP to 15,000 cP. In some embodiments, the ASW powder filled coating, the AC powder filled coating, or combination thereof has a viscosity of 100 cP to 10,000 cP. In some embodiments, the ASW powder filled coating, the AC powder filled coating, or combination thereof has a viscosity of 100 cP to 5,000 cP. In some embodiments, the ASW powder filled coating, the AC powder filled coating, or combination thereof has a viscosity of 100 cP to 1,000 cP. In some embodiments, the ASW powder filled coating, the AC powder filled coating, or combination thereof has a viscosity of 100 cP to 500 cP.

In some embodiments, the ASW powder filled coating, the AC powder filled coating, or combination thereof has a viscosity of 500 cP to 15,000 cP. In some embodiments, the ASW powder filled coating, the AC powder filled coating, or combination thereof has a viscosity of 1,000 cP to 10,000 cP. In some embodiments, the ASW powder filled coating, the AC powder filled coating, or combination thereof has a viscosity of 5,000 cP.

In some embodiments, the ASW powder filled coating, the AC powder filled coating, or combination thereof is applied to a fiberglass mat to form a coated fiberglass mat. In some embodiments, at least one of granules or sand are applied to the coated fiberglass mat to form an asphalt shingle.

FIG. 3 depicts an exemplary non-limiting method according to some embodiments of the present disclosure showing a continuous process of producing an ASW powder filled coating, the AC powder filled coating, or combination thereof as described herein. The non-limiting example of FIG. 3 may include the following steps detailed below.

Sufficient grinding and screening steps (not shown) may be performed on ASW to result in ASW powder 301 having the average particle size described herein. In some embodiments, an AC powder 301 can be obtained. In some embodiments a combination 301 of ASW powder and AC powder can be obtained.

A specified amount of the ASW powder, the AC powder, or combination thereof 301 described herein, is combined with a specified amount of asphalt coating, described herein in tank 302 and fed into first mixers 303a and 303b, where a sufficient amount of shear is applied so as to form a mixture of: ASW powder, AC powder, or combination thereof; and asphalt coating, as described herein. While the embodiment of FIG. 3 depicts two first mixers 303a and 303b, in some embodiments, a single first mixer can be used.

Heat exchanger 304 heats the mixture of: ASW powder, AC powder, or combination thereof; and asphalt coating to a specified temperature so as to form a heated mixture of the ASW or AC powder and the asphalt coating, as described herein. While the embodiment of FIG. 3 depicts heat exchanger 304, any heater or combination of heaters described herein can be used.

A specified amount of the heated mixture of: the ASW powder, AC powder, or combination thereof; and the asphalt coating can be fed into storage tank 305. The storage tank 305 may be in thermal communication with a heater, such as heat exchanger 306.

A specified amount of the heated mixture of the ASW powder, AC powder, or combination thereof; and the asphalt coating can be conveyed from storage tank 305 into second mixer 307 where the at least one filler material 308, described herein, is introduced to the heated mixture of the ASW powder, AC powder, or combination thereof; and the asphalt coating. A sufficient amount of shear is applied to form the ASW powder filled coating, AC powder filled coating, or combination thereof.

The ASW powder filled coating, the AC powder filled coating, or combination thereof can be fed into surge tank 309 where the ASW powder filled coating, the AC powder filled coating, or combination thereof can be stirred until homogenous. The ASW or AC powder filled coating can be transported to coater 310 where, in some embodiments, the ASW powder filled coating, the AC powder filled coating, or combination thereof is applied to a fiberglass mat to form a coated fiberglass mat; and where, in some embodiments, at least one of granules or sand are applied to the coated fiberglass mat to form an asphalt shingle.

Additional Exemplary Embodiments

In some embodiments, any of the briquetting steps described herein, any of the ASW powder formation steps described herein, any of the ASW powder filled coating formation steps described herein, or any combination thereof may be combined without departing from the scope of the present disclosure. In addition, in any of the aforementioned embodiments, at least one: of AC powder, ASW powder, AC powder filled coatings, ASW powder filled coatings, combinations thereof, or briquettes comprising any of the foregoing may be used in any step described herein without departing from the scope of the present disclosure.

At least some non-limiting aspects of the present disclosure will now be described with reference to the following numbered embodiments hereinafter designated as [E1, E2, E3, E4 . . . ]

E1: A method comprising:
obtaining asphalt shingle waste (ASW),
  wherein the ASW comprises:
    asphalt,
    limestone,
    granules, and
    impurities;
grinding the ASW to form ground ASW;
screening the ground ASW with a rotary screener,
  wherein the screening of the ground ASW with the rotary screener results in:
    a first set of ASW particles,
      wherein the first set of ASW particles has an average particle size of 425 microns to 6350 microns, and
    a second set of ASW particles,
      wherein the second set of ASW particles has an average particle size of 2 microns to 425 microns;

removing at least some of the granules from at least one of the first set of ASW particles, the second set of ASW particles, or a combination thereof with at least one granule liberator;
grinding the first set of ASW particles,
  wherein the grinding of the first set of ASW particles results in a third set of ASW particles,
    wherein the third set of ASW particles has an average particle size of 2 microns to 425 microns;
separating the second and third sets of ASW particles using an air separator,
  wherein the separating using the air separator results in:
    a fourth set of ASW particles,
      wherein the fourth set of ASW particles have an average particle size of 250 microns to 450 microns; and
    a fifth set of ASW particles,
      wherein the fifth set of ASW particles have an average particle size of 2 microns to 250 microns;
grinding the fourth set of ASW particles;
  wherein the grinding of the fourth set of ASW particles results in a sixth set of ASW particles,
    wherein the sixth set of ASW particles have an average particle size of 2 microns to 250 microns;
  wherein each of the fifth set of ASW particles and the sixth set of ASW particles is an ASW powder having the following composition:
    5 wt % to 40 wt % asphalt based on a total weight of the ASW powder, and
    60 wt % to 95 wt % of limestone, granules, and impurities based on the total weight of the ASW powder,
wherein the method does not comprise a wet extraction step.

E2: The method of E1, wherein the rotary screener is a trommel screener.

E3: The method of E1, E2, or any combination thereof, wherein the method does not comprise a grinding step after the step of grinding the fourth set of ASW particles.

E4: The method of E1, E2, E3 or any combination thereof, wherein the method does not comprise any grinding steps other than the steps of: grinding the ASW, grinding the first set of ASW particles, and grinding the fourth set of ASW particles.

E5: The method of E1, E2, E3, E4 or any combination thereof, wherein the impurities comprise least one of: fiberglass mat sand, fines, marker paint, sealant, one or more adhesives, tape, plastic debris, paper debris, soil, woods, nails, or any combination thereof.

E6: The method of E1, E2, E3, E4, E5, or any combination thereof, wherein the method does not comprise any steps of screening with a vibratory screener.

E7: The method of E1, E2, E3, E4, E5, E6, or any combination thereof, wherein the method does not comprise any steps of screening with a screening device that comprises at least one ball tray.

E8: The method of E1, E2, E3, E4, E5, E6, E7 or any combination thereof, wherein the method does not comprise any steps of screening with a sizing shaker.

E9: The method of E1, E2, E3, E4, E5, E6, E7, E8, or any combination thereof, wherein the method does not comprise a screening step after the step of separating the second and third sets of ASW particles using the air separator.

E10: The method of E1, E2, E3, E4, E5, E6, E7, E8, E9 or any combination thereof, wherein the second and third sets of ASW particles are combined prior to the step of separating the second and third sets of ASW particles using the air separator.

E11: The method of E1, E2, E3, E4, E5, E6, E7, E8, E9, E10, or any combination thereof wherein the fifth set of ASW particles and the sixth set of ASW particles are combined to form the ASW powder.

E12: The method of E1, E2, E3, E4, E5, E6, E7, E8, E9, E10, E11, or any combination thereof, wherein the method further comprises forming the ASW powder into a plurality of briquettes.

E13: The method of E12, wherein forming the ASW powder into the plurality of briquettes comprises adding limestone powder to the ASW powder.

E14: The method of E12, wherein the forming the ASW powder into the plurality of briquettes comprises compressing the ASW powder at a pressure sufficient to form the plurality of briquettes.

E15: The method of E14, wherein the pressure sufficient to form the plurality of briquettes ranges from 200 psi to 20,000 psi.

E16: The method of E12, wherein each briquette of the plurality of briquettes is an oblate shperoid E17: The method of E16, wherein each briquette of the plurality of briquettes has a first diameter and a second diameter, wherein at least one of: the first diameter, the second diameter, or any combination thereof ranges from 0.5 inches to 2 inches.

E18: The method of E1, E2, E3, E4, E5, E6, E7, E8, E9, E10, E11, E12, E13, E14, E15, E16, E17, or any combination thereof, wherein the at least one granule liberator comprises a rotary impact separator.

E19: The method of E1, E2, E3, E4, E5, E6, E7, E8, E9, E10, E11, E12, E13, E14, E15, E16, E17, E18, or any combination thereof, wherein the method further comprises using a scalping screen to separate particles having an average particle size of 4 microns to 425 microns from the ground ASW.

E20: The method of E19, wherein the step of using the scalping screen is performed between the steps of: grinding the ASW and screening the ground ASW.

E21: The method of E1, E2, E3, E4, E5, E6, E7, E8, E9, E10, E11, E12, E13, E14, E15, E16, E17, E18, E19, E20, or any combination thereof, wherein the method comprises deagglomerating the ground ASW using a lump breaker.

E22: The method of E21, wherein the step of deagglomerating the ground ASW is performed between the steps of: grinding the ASW and screening the ground ASW.

E23: A method comprising:
  obtaining asphalt shingle waste (ASW),
    wherein the ASW comprises:
      asphalt,
      limestone,
      granules, and
      impurities;
  grinding the ASW to form ground ASW;
  screening the ground ASW with a rotary screener,
    wherein the screening of the ground ASW with the rotary screener results in:
      a first set of ASW particles,
        wherein the first set of ASW particles has an average particle size of 425 microns to 6350 microns, and
      a second set of ASW particles,
        wherein the second set of ASW particles has an average particle size of 2 microns to 425 microns;
  removing at least some of the granules from at least one of: the first set of ASW particles, the second set of ASW particles, or a combination thereof with a granule liberator;
  grinding the first set of ASW particles,
    wherein the grinding of the first set of ASW particles results in a third set of ASW particles,
    wherein the third set of ASW particles has an average particle size of 2 microns to 425 microns;
  separating the second and third sets of ASW particles using an air separator,
    wherein the separating using the air separator results in:
      a fourth set of ASW particles,
        wherein the fourth set of ASW particles have an average particle size of 250 microns to 450 microns; and
      a fifth set of ASW particles,
        wherein the fifth set of ASW particles have an average particle size of 2 microns to 250 microns;
  grinding the fourth set of ASW particles;
    wherein the grinding of the fourth set of ASW particles results in a sixth set of ASW particles,
    wherein the sixth set of ASW particles have an average particle size of 2 microns to 250 microns;
    wherein each of the fifth set of ASW particles and the sixth set of ASW particles is an ASW powder having the following composition:
      5 wt % to 40 wt % asphalt based on a total weight of the ASW powder, and
      60 wt % to 95 wt % of limestone, granules, and impurities based on the total weight of the ASW powder,
  forming the ASW powder into a plurality of briquettes;
  wherein the method does not comprise a wet extraction step.

E24: The method of E23, wherein forming the ASW powder into the plurality of briquettes comprises adding limestone powder to the ASW powder.

E25: The method of E23 or E24, wherein the forming the ASW powder into the plurality of briquettes comprises compressing the ASW powder at a pressure sufficient to form the plurality of briquettes.

E26: The method of E25 wherein the pressure sufficient to form the plurality of briquettes ranges from 200 psi to 20,000 psi.

E27: A method comprising:
  obtaining asphalt shingle waste (ASW),
    wherein the ASW comprises:
      asphalt,
      limestone,
      granules, and
      impurities;
  grinding the ASW to form ground ASW;
  screening the ground ASW with a rotary screener,
    wherein the screening of the ground ASW with the rotary screener results in:
      a first set of ASW particles,
        wherein the first set of ASW particles has an average particle size of 425 microns to 6350 microns, and a second set of ASW particles,
wherein the second set of ASW particles has an average particle size of 2 microns to 425 microns;
removing at least some of the granules from at least one of: the first set of ASW particles, the second set of ASW particles, or a combination thereof with a granule liberator;
grinding the first set of ASW particles,
wherein the grinding of the first set of ASW particles results in a third set of ASW particles,
wherein the third set of ASW particles has an average particle size of 2 microns to 425 microns;
separating the second and third sets of ASW particles using an air separator,
wherein the separating using the air separator results in:
a fourth set of ASW particles,
wherein the fourth set of ASW particles have an average particle size of 250 microns to 450 microns; and
a fifth set of ASW particles,
wherein the fifth set of ASW particles have an average particle size of 2 microns to 250 microns;
grinding the fourth set of ASW particles;
wherein the grinding of the fourth set of ASW particles results in a sixth set of ASW particles,
wherein the sixth set of ASW particles has an average particle size of 2 microns to 250 microns;
wherein at least one of: the second set of ASW particles, the third set of ASW particles, the fourth set of ASW particles, the fifth set of ASW particles, the sixth set of ASW particles or any combination thereof comprises an ASW powder having the following composition:
5 wt % to 40 wt % asphalt based on a total weight of the ASW powder, and
60 wt % to 95 wt % of limestone, granules, and impurities based on the total weight of the ASW powder,
obtaining the ASW powder from at least one of: the second set of ASW particles, the third set of ASW particles, the fourth set of ASW particles, the fifth set of ASW particles, the sixth set of ASW particles, or any combination thereof,
wherein the ASW powder has an average particle size of 2 microns to 425 microns;
feeding a sufficient amount of the ASW powder and a sufficient amount of an asphalt coating into at least one first mixer to form a mixture of the ASW powder and the asphalt coating;
wherein the mixture of the ASW powder and the asphalt coating has the following composition:
0.1 wt % to 50 wt % ASW powder based on a total weight of the mixture, and
50 wt % to 99.9 wt % of the asphalt coating based on a total weight of the mixture;
heating the mixture of the ASW powder and the asphalt coating to form a heated mixture;
wherein the heated mixture has a temperature in a range of 400° F. to 500° F.;
conveying the heated mixture of the ASW powder and the asphalt coating to at least one second mixer;
mixing a sufficient amount of at least one filler material with the heated mixture in the second mixer to obtain an ASW powder filled coating;
wherein the ASW powder filled coating has the following composition:
30 wt % to 50 wt % asphalt based on the total weight of the ASW powder filled coating, and
50 wt % to 70 wt % of: limestone powder, granules, impurities, and the at least one filler material based on the total weight of the ASW powder filled coating.

E28: A method comprising:
obtaining asphalt shingle waste (ASW),
wherein the ASW comprises:
asphalt,
limestone,
granules, and
impurities;
grinding the ASW to form ground ASW;
screening the ground ASW with a rotary screener,
wherein the screening of the ground ASW with the rotary screener results in:
a first set of ASW particles,
wherein the first set of ASW particles has an average particle size of 425 microns to 6350 microns, and
a second set of ASW particles,
wherein the second set of ASW particles has an average particle size of 2 microns to 425 microns;
removing at least some of the granules from at least one of: the first set of ASW particles, the second set of ASW particles, or a combination thereof with a granule liberator;
grinding the first set of ASW particles,
wherein the grinding of the first set of ASW particles results in a third set of ASW particles,
wherein the third set of ASW particles has an average particle size of 2 microns to 425 microns;
separating the second and third sets of ASW particles using an air separator,
wherein the separating using the air separator results in:
a fourth set of ASW particles,
wherein the fourth set of ASW particles have an average particle size of 250 microns to 450 microns; and
a fifth set of ASW particles,
wherein the fifth set of ASW particles have an average particle size of 2 microns to 250 microns;
grinding the fourth set of ASW particles;
wherein the grinding of the fourth set of ASW particles results in a sixth set of ASW particles,
wherein the sixth set of ASW particles has an average particle size of 2 microns to 250 microns;
wherein at least one of: the second set of ASW particles, the third set of ASW particles, the fourth set of ASW particles, the fifth set of ASW particles, the sixth set of ASW particles or any combination thereof comprises an ASW powder having the following composition:
5 wt % to 40 wt % asphalt based on a total weight of the ASW powder, and
60 wt % to 95 wt % of limestone, granules, and impurities based on the total weight of the ASW powder,
obtaining the ASW powder from at least one of: the second set of ASW particles, the third set of ASW particles, the fourth set of ASW particles, the fifth set of ASW particles, the sixth set of ASW particles, or any combination thereof,
wherein the ASW powder has an average particle size of 2 microns to 425 microns;
forming the ASW powder into a plurality of briquettes;
feeding a sufficient amount of the plurality of briquettes and a sufficient amount of an asphalt coating into at least one first mixer to form a mixture of the ASW powder and the asphalt coating;
wherein the mixture of the ASW powder and the asphalt coating has the following composition:
0.1 wt % to 50 wt % ASW powder based on a total weight of the mixture, and
50 wt % to 99.9 wt % of the asphalt coating based on a total weight of the mixture;
heating the mixture of the ASW powder and the asphalt coating to form a heated mixture;
wherein the heated mixture has a temperature in a range of 400° F. to 500° F.;
conveying the heated mixture of the ASW powder and the asphalt coating to at least one second mixer;
mixing a sufficient amount of at least one filler material with the heated mixture in the second mixer to obtain an ASW powder filled coating;
wherein the ASW powder filled coating has the following composition:
30 wt % to 50 wt % asphalt based on the total weight of the ASW powder filled coating, and
50 wt % to 70 wt % of: limestone powder, granules, impurities, and the at least one filler material based on the total weight of the ASW powder filled coating.

E29: A method comprising:
obtaining asphalt shingle waste (ASW);
wherein the ASW comprises:
asphalt,
limestone powder,
granules, and
impurities;
performing sufficient grinding steps and screening steps on the ASW to result in ASW powder having an average particle size of 2 microns to 425 microns and the following composition:
5 wt % to 40 wt % asphalt based on a total weight of the ASW powder,
60 wt % to 95 wt % limestone powder, granules, and impurities based on the total weight of the ASW powder;
wherein the grinding steps and screening steps do not comprise wet extraction steps;
feeding a sufficient amount of the ASW powder and a sufficient amount of an asphalt coating into at least one first mixer to form a mixture of the ASW powder and the asphalt coating;
wherein the mixture of the ASW powder and the asphalt coating has the following composition:
0.1 wt % to 50 wt % ASW powder based on a total weight of the mixture, and
50 wt % to 99.9 wt % of the asphalt coating based on a total weight of the mixture;
heating the mixture of the ASW powder and the asphalt coating to form a heated mixture;
wherein the heated mixture has a temperature in a range of 400° F. to 500° F.;
conveying the heated mixture of the ASW powder and the asphalt coating to at least one second mixer;
mixing a sufficient amount of at least one filler material with the heated mixture in the second mixer to obtain an ASW powder filled coating;
wherein the ASW powder filled coating has the following composition:
30 wt % to 50 wt % asphalt based on the total weight of the ASW powder filled coating, and
50 wt % to 70 wt % of: the limestone powder, the granules, the impurities, and the at least one filler material based on the total weight of the ASW powder filled coating.

E30: The method of E29, wherein the impurities comprise at least one of: fiberglass mat sand, fines, marker paint, sealant, one or more adhesives, tape, plastic debris, paper debris, soil, woods, nails, or any combination thereof.

E31: The method of E29 or E30, wherein the at least one filler material is limestone powder; and wherein the ASW powder filled coating has the following composition:
30% to 50% asphalt based on the total weight of the ASW powder filled coating, and
50% to 70% of: limestone powder, granules, and impurities based on the total weight of the ASW powder filled coating.

E32: the method of E29, E30, E31, or any combination thereof further comprising applying the ASW powder filled coating to a fiberglass mat to form a coated fiberglass mat.

E33: the method of E32, further comprising applying at least one of granules or sand to the coated fiberglass mat to form an asphalt shingle.

E34: the method of E29, E30, E31, E32, E33, or any combination thereof, wherein the ASW consists essentially of:
asphalt,
limestone powder,
granules, and
impurities.

E35: the method of E29, E30, E31, E32, E33, E34, or any combination thereof, wherein the ASW powder has the following composition:
25 wt % to 30 wt % asphalt based on a total weight of the ASW powder;
70 wt % to 75 wt % limestone powder, granules, and impurities based on the total weight of the ASW powder.

E36: the method of E29, E30, E31, E32, E33, E34, E35, or any combination thereof, wherein the asphalt coating comprises at least one of: oxidized asphalt coating, polymer modified asphalt coating, or mixtures thereof.

E37: the method of E29, E30, E31, E32, E33, E34, E35, E36, or any combination thereof, wherein the polymer modified asphalt coating is poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

E38: the method of E29, E30, E31, E32, E33, E34, E35, E36, E37, or any combination thereof, wherein the weight percentage of asphalt in the ASW powder filled coating, based on the total weight of the ASW powder filled coating, is the same as a weight percentage of asphalt in a powder filled coating that does not contain any ASW.

E39: the method of E29, E30, E31, E32, E33, E34, E35, E36, E37, E38, or any combination thereof, wherein the mixture of the ASW powder and the asphalt coating is not subjected to grinding or screening steps.

E40: the method of E29, E30, E31, E32, E33, E34, E35, E36, E37, E38, E39, or any combination thereof, wherein the ASW powder filled coating comprises 1 wt % to 40 wt % of the ASW powder based on the total weight of the ASW powder filled coating.

E41: the method of E29, E30, E31, E32, E33, E34, E35, E36, E37, E38, E39, E40 or any combination thereof, wherein the method further comprises, after performing sufficient grinding steps and screening steps on the ASW to result in the ASW powder, forming the ASW powder into a plurality of briquettes.

E42: the method of E41, wherein the step of forming the ASW powder into the plurality of briquettes comprises adding limestone powder to the ASW powder.

E43: The method of E41 or E42 wherein the step of forming the ASW powder into the plurality of briquettes comprises compressing the ASW powder at a pressure sufficient to form the plurality of briquettes.

E44: The method of E41, E42, E43, or any combination thereof wherein the pressure sufficient to form the plurality of briquettes ranges from 200 psi to 20,000 psi.

E45: The method of E41, E42, E43, E44 or any combination thereof wherein during the step of feeding the sufficient amount of the ASW powder and the sufficient amount of an asphalt coating into at the least one first mixer, at least a portion of the ASW powder takes the form of a plurality of briquettes.

E46: The method of E29, E30, E31, E32, E33, E34, E35, E36, E37, E38, E39, E40, E41, E42, E43, E44, E45, or any combination thereof, wherein the ASW powder filled coating has a viscosity of 100 cP to 20,000 cP.

E47: A method comprising:
  obtaining asphalt containing (AC) powder;
    wherein the AC powder has an average particle size of 2 microns to 425 microns;
    wherein the AC powder comprises ASW powder;
    wherein the AC powder has the following composition:
      5 wt % to 40 wt % asphalt based on a total weight of the AC powder,
      60 wt % to 95 wt % limestone powder, granules, and impurities based on the total weight of the AC powder;
  feeding a sufficient amount of the AC powder and a sufficient amount of an asphalt coating into at least one first mixer to form a mixture of the AC powder and the asphalt coating;
    wherein the mixture of the AC powder and the asphalt coating has the following composition:
      0.1 wt % to 50 wt % of AC powder based on a total weight of the mixture, and
      50 wt % to 99.9 wt % of the asphalt coating based on a total weight of the mixture;
  heating the mixture of the AC powder and the asphalt coating to form a heated mixture;
    wherein the heated mixture has a temperature in a range of 400° F. to 500° F.;
  conveying the heated mixture of the AC powder and the asphalt coating to at least one second mixer;
  mixing a sufficient amount of at least one filler material with the heated mixture in the second mixer to obtain an AC powder filled coating;
    wherein the AC powder filled coating has the following composition:
      30 wt % to 50 wt % asphalt based on the total weight of the AC powder filled coating, and
      50 wt % to 70 wt % of: limestone powder, granules, impurities, and the at least one filler material based on the total weight of the AC powder filled coating.

E48: The method of E47, wherein the AC powder filled coating has a viscosity of 100 cP to 20,000 cP.

E49: A method comprising:
  obtaining a plurality of briquettes,
    wherein each briquette of the plurality of briquettes comprises asphalt containing (AC) powder, asphalt shingle waste (ASW) powder, or any combination thereof;
    wherein the AC powder, the ASW powder, or combination thereof has an average particle size of 2 microns to 425 microns and the following composition:
      5 wt % to 40 wt % asphalt based on a total weight of the AC powder, the ASW powder, or any combination thereof,
      60 wt % to 95 wt % limestone powder, granules, and impurities based on the total weight of the AC powder, the ASW powder, or any combination thereof;
  feeding a sufficient amount of the briquettes and a sufficient amount of an asphalt coating into at least one first mixer to form a mixture of: the AC powder, the ASW powder, or combination thereof; and the asphalt coating;
    wherein the mixture of: the AC powder, the ASW powder, or combination thereof; and the asphalt coating has the following composition:
      0.1 wt % to 50 wt % of the AC powder, the ASW powder, or combination thereof based on a total weight of the mixture; and
      50 wt % to 99.9 wt % of the asphalt coating based on a total weight of the mixture;
  heating the mixture of: the AC powder, the ASW powder, or combination thereof; and the asphalt coating to form a heated mixture;
    wherein the heated mixture has a temperature in a range of 400° F. to 500° F.;
  conveying the heated mixture of the AC powder, the ASW powder, or combination thereof and the asphalt coating to at least one second mixer;
  mixing a sufficient amount of at least one filler material with the heated mixture in the second mixer to obtain an AC powder filled coating, an ASW powder filled coating or combination thereof;
    wherein the AC powder filled coating, the ASW powder filled coating, or combination thereof has the following composition:
      30 wt % to 50 wt % asphalt based on the total weight of the AC powder filled coating, the ASW powder filled coating, or combination thereof, and
      50 wt % to 70 wt % of: limestone powder, granules, impurities, and the at least one filler material based on the total weight of the AC powder filled coating, the ASW powder filled coating, or combination thereof.

E50: The method of E49, wherein obtaining the plurality of briquettes comprises:
  performing sufficient grinding steps and screening steps on ASW to result in ASW powder; and
  compressing the ASW powder at a pressure sufficient to form the plurality of briquettes.

E51: The method of E49 or E50, wherein obtaining the plurality of briquettes further comprises adding at least one of: limestone powder, at least one other filler, AC powder, or any combination thereof to the ASW powder.

E52: The method of E49, E50, E51, or any combination thereof wherein the pressure sufficient to form the plurality of briquettes ranges from 200 psi to 20,000 psi.

E53: The method of E49, E50, E51, E52 or any combination thereof, wherein the ASW comprises:
asphalt,
limestone powder,
granules, and
impurities.

While several embodiments of the present disclosure have been described, these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A roofing shingle comprising:
a fiberglass mat;
an asphalt shingle waste (ASW) filled coating on the fiberglass mat,
wherein the ASW filled coating comprises:
asphalt,
wherein the asphalt comprises 0.1% to 40% by weight of waste asphalt based on a total weight of the asphalt; and
50% to 70% by weight of a filler material based on a total weight of the ASW filled coating,
wherein the filler material comprises limestone;
wherein the ASW filled coating has a viscosity of 100 cP to 20,000 cP as measured in accordance with ASTM D-4402 using a Brookfield LVT viscometer at 30 RPM and at 400° F.; and
granules on the ASW filled coating.

2. The roofing shingle of claim 1, wherein the asphalt further comprises an oxidized asphalt.

3. The roofing shingle of claim 1, wherein the asphalt further comprises a polymer-modified asphalt.

4. The roofing shingle of claim 1, wherein the asphalt further comprises at least one poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

5. The roofing shingle of claim 1, wherein the asphalt comprises:
0.1% to 30% by weight of the waste asphalt based on the total weight of the asphalt.

6. The roofing shingle of claim 1, wherein the asphalt comprises:
0.1% to 20% by weight of the waste asphalt based on the total weight of the asphalt.

7. The roofing shingle of claim 1, wherein the asphalt comprises:
0.1% to 10% by weight of the waste asphalt based on the total weight of the asphalt.

8. The roofing shingle of claim 1, wherein the asphalt comprises:
0.1% to 5% by weight of the waste asphalt based on the total weight of the asphalt.

9. The roofing shingle of claim 1, wherein the asphalt comprises:
0.1% to 2% by weight of the waste asphalt based on the total weight of the asphalt.

10. The roofing shingle of claim 1, wherein the asphalt comprises:
0.1% to 1% by weight of the waste asphalt based on the total weight of the asphalt.

11. The roofing shingle of claim 1, wherein the asphalt comprises:
1% to 40% by weight of the waste asphalt based on the total weight of the asphalt.

12. The roofing shingle of claim 1, wherein the asphalt comprises:
2% to 30% by weight of the waste asphalt based on the total weight of the asphalt.

13. The roofing shingle of claim 1, wherein the asphalt comprises:
5% to 20% by weight of the waste asphalt based on the total weight of the asphalt.

14. The roofing shingle of claim 1, wherein the asphalt comprises:
10% to 15% by weight of the waste asphalt based on the total weight of the asphalt.

15. The roofing shingle of claim 1, wherein the ASW filled coating comprises:
30% to 50% by weight of the asphalt based on the total weight of the ASW filled coating.

16. The roofing shingle of claim 1, wherein the ASW filled coating comprises:
30% to 45% by weight of the asphalt based on the total weight of the ASW filled coating.

17. The roofing shingle of claim 1, wherein the ASW filled coating comprises:
30% to 40% by weight of the asphalt based on the total weight of the ASW filled coating.

18. The roofing shingle of claim 1, wherein the ASW filled coating comprises:
35% to 45% by weight of the asphalt based on the total weight of the ASW filled coating.

19. The roofing shingle of claim 1, wherein the ASW filled coating comprises:
55% to 70% by weight of the filler material based on the total weight of the ASW filled coating.

20. The roofing shingle of claim 1, wherein the ASW filled coating comprises:
60% to 70% by weight of the filler material based on the total weight of the ASW filled coating.

21. The roofing shingle of claim 1, wherein the ASW filled coating comprises:
55% to 65% by weight of the filler material based on the total weight of the ASW filled coating.

22. The roofing shingle of claim 1, wherein the ASW filled coating comprises:
10% to 40% by weight of the waste asphalt based on the total weight of the ASW filled coating.

23. The roofing shingle of claim 1, wherein the ASW filled coating comprises:
10% to 30% by weight of the waste asphalt based on the total weight of the ASW filled coating.

24. The roofing shingle of claim 1, wherein the ASW filled coating comprises:
15% to 20% by weight of the waste asphalt based on the total weight of the ASW filled coating.

25. The roofing shingle of claim 1, wherein the ASW filled coating comprises:
20% to 25% by weight of the waste asphalt based on the total weight of the ASW filled coating.

26. A roofing shingle comprising:
a fiberglass mat;
an asphalt shingle waste (ASW) filled coating on the fiberglass mat,
   wherein the ASW filled coating comprises:
      asphalt,
         wherein the asphalt comprises 0.1 to 40% by weight of waste asphalt based on a total weight of the ASW filled coating; and
      50% to 70% by weight of a filler material based on the total weight of the ASW filled coating,
         wherein the filler material comprises limestone;
   wherein the ASW filled coating has a viscosity of 100 cP to 20,000 cP as measured in accordance with ASTM D-4402 using a Brookfield LVT viscometer at 30 RPM and at 400° F.; and
granules on the ASW filled coating.

27. The roofing shingle of claim 26, wherein the asphalt further comprises an oxidized asphalt.

28. The roofing shingle of claim 26, wherein the asphalt further comprises a polymer-modified asphalt.

29. The roofing shingle of claim 26, wherein the asphalt further comprises at least one poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

30. The roofing shingle of claim 26, wherein the asphalt comprises:
   1% to 40% by weight of the waste asphalt based on the total weight of the asphalt.

* * * * *